US007515174B1

(12) United States Patent
Francisco et al.

(10) Patent No.: US 7,515,174 B1
(45) Date of Patent: Apr. 7, 2009

(54) MULTI-USER VIDEO CONFERENCING WITH PERSPECTIVE CORRECT EYE-TO-EYE CONTACT

(75) Inventors: Emmanuel C. Francisco, Northridge, CA (US); Edwin R. Leonard, San Dimas, CA (US)

(73) Assignee: DreamWorks Animation L.L.C., Glendale, CA (US)

( * ) Notice: Subject to any disclaimer, the term of this patent is extended or adjusted under 35 U.S.C. 154(b) by 853 days.

(21) Appl. No.: 11/006,166

(22) Filed: Dec. 6, 2004

(51) Int. Cl.
*H04N 7/14* (2006.01)
*G02B 5/32* (2006.01)
(52) U.S. Cl. ............... 348/14.16; 348/14.08; 348/14.09
(58) Field of Classification Search ... 348/14.01–14.09, 348/14.11–14.16, 335, 535; 359/296; 313/478, 313/474; 353/10
See application file for complete search history.

(56) References Cited

U.S. PATENT DOCUMENTS

| 2,420,198 | A | | 5/1947 | Rosenthal |
| 4,400,724 | A | | 8/1983 | Fields |
| 4,890,314 | A | | 12/1989 | Judd et al. |
| 4,928,301 | A | | 5/1990 | Smoot |
| 5,020,878 | A | * | 6/1991 | Brokenshire et al. ........ 359/466 |
| 5,117,285 | A | | 5/1992 | Nelson et al. |
| 5,187,571 | A | | 2/1993 | Braun et al. |
| 5,335,022 | A | | 8/1994 | Braun et al. |
| 5,400,069 | A | | 3/1995 | Braun et al. |
| 5,572,248 | A | | 11/1996 | Allen et al. |
| 5,883,606 | A | | 3/1999 | Smoot |
| 6,037,970 | A | * | 3/2000 | Kondo ........................ 348/14.1 |
| 6,621,865 | B1 | * | 9/2003 | Yu ........................ 375/240.16 |
| 2001/0048507 | A1 | * | 12/2001 | Thomas et al. ................ 353/10 |
| 2004/0165060 | A1 | * | 8/2004 | McNelley et al. ........ 348/14.08 |

OTHER PUBLICATIONS

Maojun, Zhang et al., "VCS: A Virtual Environment Support for Awareness and Collaboration," ACM 1-58113-239-5/99/0019 . . . , 1999, pp. 163-165.
Raskar, Ramesh et al., "Multi-Projector Displays Using Camera-Based Registration," IEEE Visualization, San Francisco, CA, US, Oct. 1999.
Raskar, Ramesh et al., "The Office of the Future: A Unified Approach to Image-Based Modeling and Spatially Immersive Displays," SIGGRAPH 98, Orlando, Florida, Jul. 19-24, 1998 (Computer Graphics Proceedings, Annual Conference Series, 1998), pp. 1-10.
Raskar, Ramesh, "Immersive Planar Display Using Roughly Aligned Projectors," Proceedings of the IEEE Virtual Reality 2000 Conference.
Tang, John et al., "Supporting Distributed Groups With a Montage of Lightweight Interactions," Proceedings of the ACM Conference on Computer Supported Cooperative Work, Chapel Hill, Oct. 22-26, 1994, pp. 23-34.

(Continued)

*Primary Examiner*—Melur Ramakrishnaiah
(74) *Attorney, Agent, or Firm*—Morrison & Foerster LLP

(57) ABSTRACT

A video conferencing system provides perspective correct eye-to-eye interaction for multiple participants at sites remote from each other. The system provides at each site a configuration of participant viewing positions, a multidirectional image capture system for capturing images of each position at one site from the perspective of each viewing position at the other site, and a multidirectional display system for displaying images of each viewing position at the other site from the perspective of each viewing position at the one site.

33 Claims, 11 Drawing Sheets

OTHER PUBLICATIONS

Toweles, Herman et al., "Transport and Rendering Challenges of Multi-Stream, 3D Tele-Immersion Data," NSF Lake Tahoe Workshop on Collaborative Virtual Reality and Visualization, Oct. 26, 2003, pp. 1-6.

Reynard, Gail, "Vivid: A Symbiosis Between Virtual Reality and Video Conferencing," UKERNA Video Conferencing Workshop, Nottingham University, May 1996, pp. 1-11.

Yang, Ruigang et al., "Creating Adaptive Views for Group Video Teleconferencing—An Image-Based Approach," Proceedings of the 2004 ACM SIGMM Workshop on Effective Telepresence, 2004.

Watabe, Kazuo, "Distributed Multiparty Desktop Conferencing System: MERMAID," Proceedings of the 1990 ACM Conference on Computer-Supported Cooperative Work, 1990, pp. 27-38.

Weiser, Mark, "The Computer for the 21$^{st}$ Century," Scientific American, Sep. 1981, pp. 94, 98-102, 104.

Gaver, William et al., "One is Not Enough: Multiple Views in a Media Space," Proceedings of the SIGCHI conference on Human factors in computing systems, Amsterdam, The Netherlands, 1993, pp. 335-341.

Greenhalgh, C. et al., "MASSIVE: A Collaborative Virtual Environment for Teleconferencing," ACM Transactions on Computer-Human Interaction, vol. 2, No. 3, Sep. 1995, pp. 239-261.

Yun, Louis et al., "Architectures for Multi-Source Multi-User Video Compositing," Proceedings of the first ACM international conference on Multimedia, Anaheim, California, US, 1993, pp. 215-223.

Isaacs, Ellen et al., "What Video Can and Can't Do For Collaboration: A Case Study," Proceedings of the First ACM International Conference on Multimedia, Anaheim, California, US, 1993, pp. 199-206.

Morikawa, Osamu et al., "HyperMirror: Toward Pleasant-to-Use Video Mediated Communication System," Proceedings of the 1998 ACM Conference on Computer Supported Cooperative Work, Seattle, Washington, US, 1993, pp. 149-158.

Hollan, Jim et al., "Beyond Being There," Proceedings of the SIGCHI conference on Human factors in computing systems, Monterey, California, US, 1992, pp. 119-125.

Fish, Robert et al., "The Video Window System in Informal Communications," Proceedings of the 1990 ACM Conference on Computer Supported Cooperative Work, pp. 1-11.

Buxton, Bill et al., "Europarc's Integrated Interactive Intermedia Facility (IIIF): Early Experiences," Proc. IFIP WG8.4 Conference on Multi-user Interfaces and Applications, Heraklion, Crete, Sep. 1990.

Buxton, W., "Telepresence: Integrating Shared Task and Person Spaces," Proceedings of the conference on Graphics interface '92, Vancouver, British Columbia, Canada, 1992, pp. 123-129.

Brittan, David, "Being There: The Promise of Multimedia Communications," In MIT Technology Review, May/Jun. 1992, pp. 42-50.

Bly, Sara et al., "Media Spaces: Bringing People Together in a Video, Audio, and Computing Environment," Communications of the ACM, vol. 36, No. 1, Jan. 1993, pp. 27-46.

Chen, Milton, "Leveraging the Asymmetric Sensitivity of Eye Contact for Videoconferencing," Proceedings of the SIGCHI conference on Human factors in computing systems: Changing our world, changing ourselves, Minneapolis, Minnesota, US, 2002, pp. 49-56.

Ahuja, S.R. et al., "The Rapport Multimedia Conferencing System," Conference Sponsored by ACM SIGOIS and IEEECS TC-OA on Office Information Systems, Palo Alto, California, US, 1998, pp. 1-8.

Kuzuoka, Hideaki et al., "Agora: A Remote Collaboration System That Enables Mutual Monitoring," CHI '99 Extended Abstracts on Human Factors in Computing Systems, Pittsburgh, Pennsylvania, US, 1999, pp. 190-191.

Tang, John et al., "Why do Users Like Video? Studies of Multimedia-Supported Collaboration," Computer Supported Cooperative Work (CSCW), 1992, 1, pp. 163-193.

Zotkin, Dmitry et al., "Smart Videoconferencing," IEEE International Conference on Multimedia and Expo (III), vol. 3, New York, NY, US, 2000.

Okada, Ken-ichi et al., "Multiparty Videoconferencing at Virtual Social Distance: MAJIC Design," Proceedings of CSCW '94. Chapel Hill, NC: ACM, 1994, pp. 385-393.

Jancke, Gavin et al., "Linking Public Spaces: Technical and Social Issues," Proceedings of the SIGCHI Conference on Human Factors in Computing.

Jancke, Gavin et al., "Linking Public Spaces: Technical and Social Issues," Proceedings of the SIGCHI Conference on Human Factors in Computing Systems, Seattle, Washington, US, 2001, pp. 530-537.

Dourish, Paul et al., "Portholes: Supporting Awareness in a Distributed Work Group," Proceedings of the SIGCHI Conference on Human Factors in Computing Systems, Monterey, CA, US, 1992, pp. 541-547.

Takemura, Haruo et al., "Cooperative Work Environment Using Virtual Workspace," Proceedings of the 1992 ACM conference on Computer-supported Cooperative Work, Toronto, Ontario, Canada, 1992, pp. 226-232.

Tang, John et al., "VideoWhiteBoard: Video Shadows to Support Remote Collaboration," Proc. Human Factors in Computing Systems, 1991, pp. 315-322.

Tang, John et al., "Supporting Distributed Groups With a Montage of Lightweight Interactions," Proceedings of the 1994 ACM Conference on Computer Supported Cooperative Work, Chapel Hill, North Carolina, US, 1994, pp. 23-34.

Tang, John et al., "Montage: Providing Teleproximity for Distributed Groups," Proceedings of the SIGCHI conference on Human Factors in Computing Systems: Celebrating Interdependence, Boston, Massachusetts, US, 1994, pp. 37-43.

Gagen, Martin, "Interactive Telepresence Case Studies," Teliris Ltd., New York, NY, US, Jun. 2002, pp. 1-8

Dodgson, N.A. et al., "Multi-View Autostereoscopic 3D Display," International Broadcasting Convention, Sep. 10-14, 1999, pp. 497-502.

Gruneberg, K. et al., "A Realtime Hardware System for Stereoscopic Videoconferencing with Viewpoint Adaptation," Proceedings of the Int. Workshop on Synthetic—Natural Hybrid Coding and Three Dimensional.

Kwon, Y. et al., "New Synthesis Method of Stereo Image in Lenticular Display System," Division of Electronics and Information Technology, Korea Institute of Science and Technology, Seoul, Korea, date unknown.

Yang, R., "Geometrically Correct Imagery for Teleconferencing," Proceedings of the seventh ACM international conference on Multimedia (Part 1), Orlando, Florida, US, 1999, pp. 179-186.

Stockton, R. et al. "Smart Projectors: Camera-Projector Systems, Shameless Plug," IEEE International Workshop on Projector-Camera Systems (PROCAMS), 2003.

Nakazawa, *Proposal For A New Eye Contact Method For Teleconference*, IEICE Transactions on Communications, vol. E76-B, No. 6, pp. 618-625, Jun. 1993, 10 pgs.

* cited by examiner

MULTI-USER VIDEO CONFERENCING WITH PERSPECTIVE CORRECT EYE-TO-EYE CONTACT

FIELD OF INVENTION

The invention relates generally to a videoconferencing system between remote sites that provides proper perspective and eye contact between the participants.

BACKGROUND OF THE INVENTION

A basic teleconferencing system typically includes at each respective site a camera for capturing a view of the participants at that site and a display for displaying a view of the participants at the other site. In traditional high end teleconferencing designs, multiple cameras are used for capturing images of participants at a site, with no (or minimal) overlap and multiple displays at another site display these different captured images. In either of these types of configurations, each display shows the image of the remote participants with a perspective that is determined by the position of the camera, which is coupled to that display. In some cases, a single camera is centrally positioned over the display device(s), and captures a wide field of view of the site. In this configuration, the perspective of the remote participants is only correct for a centrally located viewer, and only as to the remote participant seated directly in line with the camera axis. For viewers who are located to either side of the display system, the images of the remote participants do not have the correct perspective, since these viewers would normally see the remote participants from the side if in fact they were seated across from each other in the same conference room. Similarly, as to the remote participants who are located off to the side of the camera axis, their images do not have the correct perspective either.

In an attempt to obtain the proper perspective and eye contact for multiple participants, multiple cameras are typically used, with each camera focused on a particular viewing location or participant. The image stream from each camera is then provided to a corresponding display device. In this fashion, the displays show each remote participant "head on". However, this solution is also not entirely correct since the "head on" display of each remote participant also does not provide the correct perspective based on each particular perspective of the remote participants.

One approach for a multiple participant videoconferencing systems is described by Nakazawa, et al. al., in *Proposal for a New Eye Contact Method for Teleconference*, IEICE Transactions on Communications, vol. E76-B, no. 6, pp. 618-625, June 1993. Nakazawa describes a teleconferencing system for two local and two remote participants in which each site has two cameras, two projectors, and a single double-lenticular screen at each site. FIG. 1 illustrates Nakazawa's system, in which participants A and B are at one site, and participants C and D are at the other remote site. Participant A observes the images taken by camera A' and rear-screen projected by projector A" on the double lenticular screen. The complementary situation applies to participants B, C and D.

There are a number of problems with Nakazawa's system. First, as is clearly seen in FIG. 1, the position of each camera does not properly capture the perspective of the local participant as if he was located at the virtual location corresponding to the camera position and establishing eye contact with a remote participant. It can be seen that each of the cameras is angled somewhat inwardly to capture a field of view of both participants. Thus, camera A' has a very wide field of view, and is angled to the left of participant C so as to capture an image stream of both C and D even though they are different seating positions. Camera B' is likewise angled to the right of participant D so as to capture an image stream of both C and D. However, if participant A were indeed located at the virtual position Av shown in FIG. 1, he would be located directly across from, and look directly at, participant C to establish eye contact, instead of at the angle of camera A' as shown. Likewise, participant A would turn significantly to the left to establish eye contact with participant D, also at a much different angle than that shown for camera A'. As a result, participant A does not in fact see the images of participants C and D on his screen with the correct perspective for proper eye to eye contact.

A second problem with Nakazawa's system is that the design does not readily scale beyond the two-by-two configuration described. Nakazawa states that in this design there are as many cameras and projectors as there are participants, but then admits that this approach is not realistic for implementation, and suggests that one camera and one projector be shared by multiple persons. However, by definition, a single camera cannot correctly capture the proper perspective for eye-to-eye contact with between one participant (represented by the camera) and multiple remote participants.

Accordingly, it is desirable to provide a videoconferencing system that can display the images of multiple participants at a remote site with both the proper visual perspective of each displayed position of another site as if her position were located at the other site, and with the appropriate eye-to-eye contact.

SUMMARY OF INVENTION

The present invention provides various embodiments of a videoconferencing system and a method between sites providing correct perspective, multi-user eye-to-eye contact. The present invention provides the correct visual perspective for each local participant of each remote participant at the remote site thereby providing the visual sensation of being in the physical presence of the participants at the remote site and providing the appropriate eye-to-eye contact between each pair of participants.

In a general embodiment, a videoconferencing system in accordance with the present invention includes a first and a second site. Each site may be considered a local site, and the other site is then designated as a remote site with respect thereto. At each site there is a conference table with multiple viewing positions (in some cases, a viewing position may seat multiple participants). Oriented towards each viewing position are a plurality of image capture devices (e.g., cameras), each of which is disposed at a location corresponding to a virtual viewing position that represents an actual viewing position at the other site.

For example, in a first embodiment in which there are two viewing positions (first and second viewing position) at each of the first and second sites, then there are four cameras at each site, with a first group of two cameras oriented towards the local first viewing position, and a second group of two cameras oriented towards the local second viewing position. Of the first group of two cameras oriented towards the local first viewing position, one camera is disposed at or near a virtual viewing position corresponding to the first actual viewing position at the remote site, and the second camera is disposed at or near a virtual viewing position corresponding to the second actual viewing position at the remote site. Thus, each of these two cameras captures the local first viewing position with the perspective that an actual participant would have if she were present at the virtual viewing position of the camera and looking at each of the actual viewing positions at the first site, respectively. Similarly, the second group of cameras is also disposed at the virtual viewing positions that correspond to the actual viewing positions at the remote site, but are both oriented towards the local second viewing position. This approach maintains the correct perspective for each participant, and so this image capture arrangement is repeated at both sites. In contrast to Nakazawa, each participant is captured by a number of different cameras each of which maintains correct perspective for proper eye contact for its associated remote position.

The present invention also easily scales beyond the two-by-two arrangement of Nakazawa. Thus, in a second embodiment there are three viewing positions (first, second, and third viewing position) at each of the first and second sites, and thus there would be nine cameras at each site, with a first group of three cameras oriented towards the local first viewing position, a second group of three cameras oriented towards the local second viewing position, and a third group of three cameras oriented towards the local third viewing position. Of the first group of three cameras oriented towards the local first viewing position, one camera is disposed at or near a virtual viewing position corresponding to the first actual viewing position at the remote site, the second camera is disposed at or near a virtual viewing position corresponding to the second actual viewing position at the remote site, and the third camera is disposed at or near a virtual viewing position corresponding to the third viewing position at the remote site. Thus, each of these three cameras captures the local first viewing position with the perspective that an actual participant would have if she was present at the virtual viewing position of the camera and looking at each of the actual viewing positions at the first site, respectively. Again, this approach maintains the correct perspective for each participant, and so this image capture arrangement is repeated for each of the other two local viewing positions (i.e., with three cameras disposed at three different corresponding virtual positions and oriented towards the local second viewing positions, and the last three cameras similarly disposed and oriented towards the local third viewing position), and at both sites in a symmetrical manner.

Finally, to achieve the desired eye-to-eye contact, the captured images are displayed on the multiple multidirectional display devices at each site in the following manner. Situated across from the viewing positions are a plurality of multidirectional display systems. Each display system receives images streams from a distinct combination of cameras at the remote site, in particular from each of the cameras oriented towards one of the actual viewing locations at the remote site.

Accordingly, in the first embodiment, a first display system will receive the image streams from the one camera in each of the two groups that is oriented towards the first actual viewing position and a second display system will receive the image streams from the one camera in a each group that oriented towards the second actual viewing position. Again, this replicated at the remote location as well. Similarly, in the second embodiment with three viewing positions, a first display system will receive the image streams from the one camera in each of the three groups that is oriented towards the first actual viewing position, a second display system will receive the image streams from the one camera in a each group that oriented towards the second actual viewing position, and the third display will receive the image streams from the one camera in each group that is oriented towards the third actual viewing position.

The particular image streams that a given display system receives will be those from the cameras associated with the virtual viewing position having the same perspective as the actual viewing position in the remote location. Accordingly, each display device receives a plurality of different image streams. Each display device then displays these image streams concurrently using either spatial and/or temporal multiplexing, so that to the respective participants at the local viewing positions see the image stream of the remote participant that corresponds to the perspective that such as local participant would have if the remote participant were in fact present at the local site and sitting at about the virtual viewing position (i.e., about where the display device is located). When this pattern of image capture and display is repeated at both sites, then all participants view each other with the correct perspective and eye to eye contact given their relative seating positions.

In one embodiment, each display device is a multi-angle lenticular display device, adapted to spatially multiplex multiple images streams, and direct the different image streams to corresponding separate lenticular lens groups. This results in each image stream being directed (refracted) towards the corresponding local viewing position so that a participant at such local viewing position sees just that image stream.

The present invention has embodiments in the various video conferencing systems and site configurations, as described above, as well as in the methodologies of arranging and operating the videoconferencing systems, in the software and hardware elements that support the videoconferencing systems, and in the connectivity relationships between multiple conferencing sites.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE EMBODIMENTS

Figure 1:
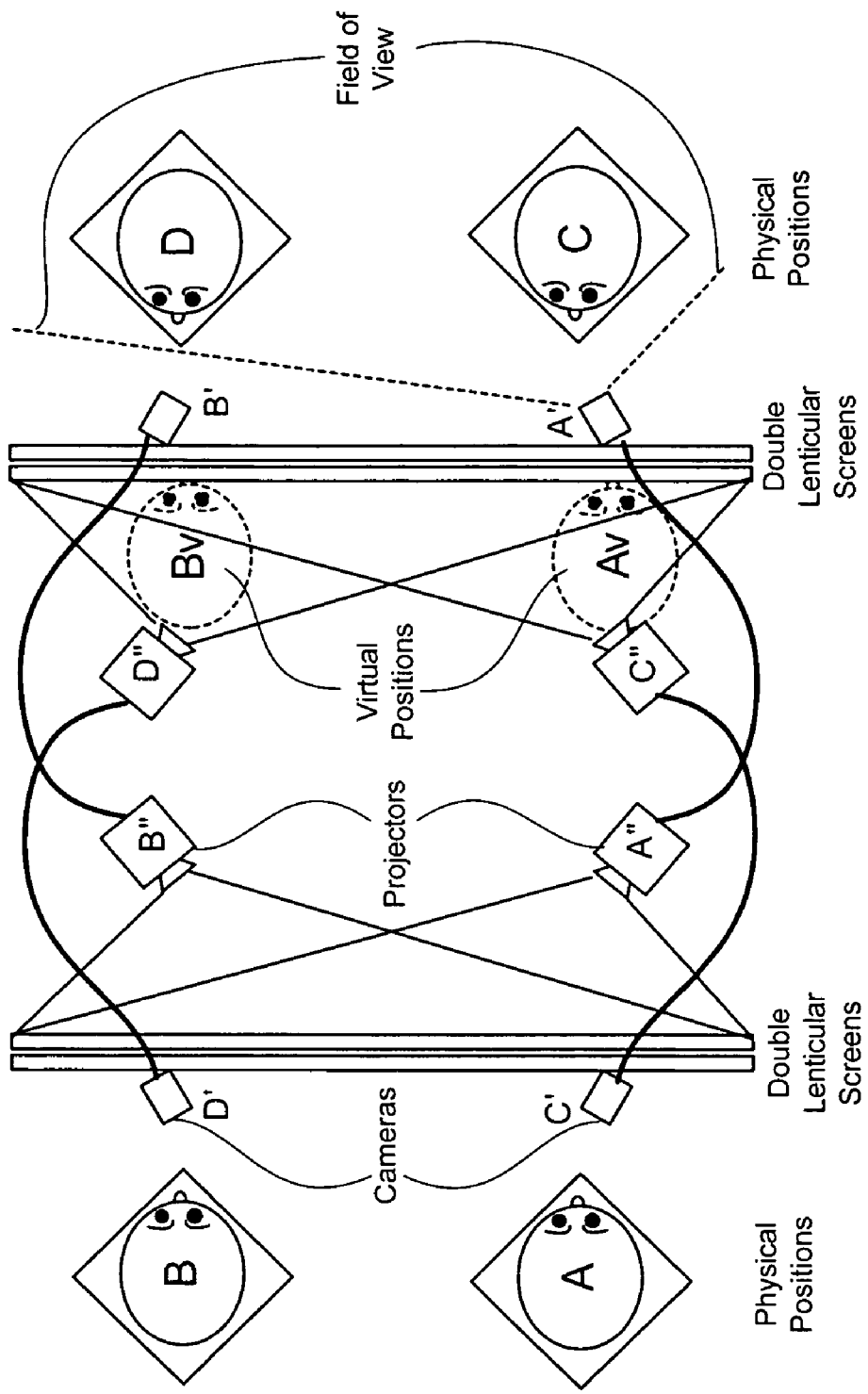
FIG. 1 illustrates a prior art visual teleconferencing system being used by participants at a local site and a remote site.
Figure 2:
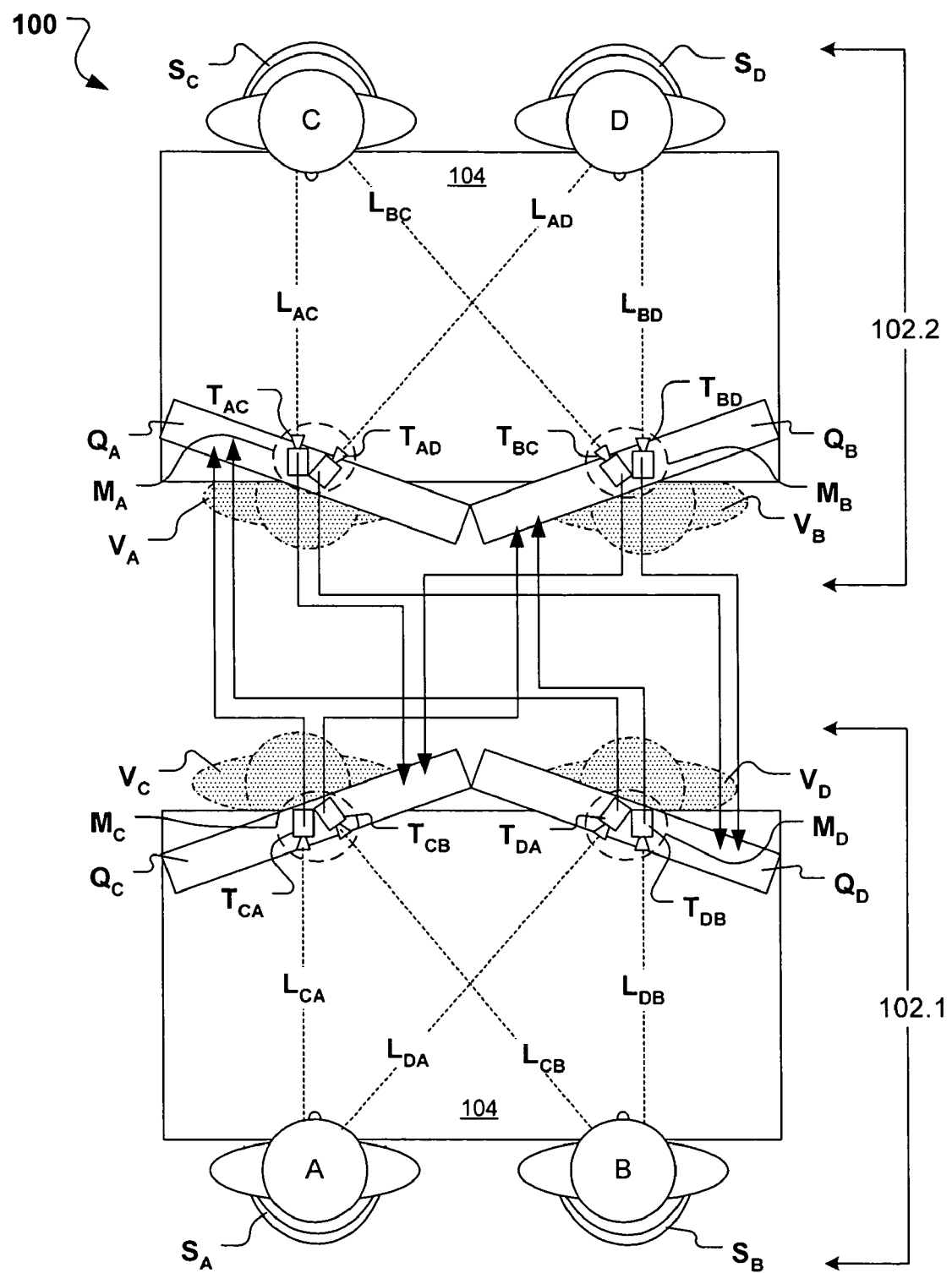
FIG. 2 illustrates a schematic overview of a system for visual communication between two sites for providing multi-user eye-to-eye interaction between two participants at each site.

FIG. 2 illustrates a system 100 for visual communication between two sites 102.1, and providing perspective correct eye-to-eye contact between all of the participants at the sites 102.2. The nomenclature of FIG. 2 is as follows:

Participants are indicated as A, B, C, and D, and are located at respective actual viewing positions $S_i$, where i indicates the participant.

Virtual viewing positions are designated $V_i$, where i corresponds to the participant (and hence actual viewing position) at the remote site. A virtual viewing position V thus has the perspective that a participant would have if sitting there. The virtual viewing positions V are illustrated as the grayed out body outlines of the participants.

A line of sight $L_{ij}$ identifies the orientation (or view) from a virtual viewing position $V_i$ to actual viewing position $S_j$ where participant j would be located.

Image capture devices (e.g., cameras) are designated $T_{ij}$, where i designates the remote participant (and viewing position) whose perspective is captured by the image capture device, and j designates the local participant towards whom the image capture device is oriented. Each image capture device $T_{ij}$ is thus oriented along a corresponding line of sight $L_{ij}$. Thus, the $T_{ij}$ designation expresses the distinct perspective and eye-to-eye relationship that the image capture device provides. A group of image capture devices associated with a particular virtual viewing position $V_i$ forms a multidirectional image capture system $M_i$ associated with participant i.

Multidirectional display devices are designated $Q_i$, where i designates the remote actual viewing position (and hence remote participant) of which images will be displayed on the display device to the local participants.

Given this nomenclature, the behavior and capabilities of the system 100 are now described.

As illustrated, there are two sites, a first site 102.1 and a second site 102.2 (the designation of 'first' and 'second' is effectively arbitrary, and used here only to more clearly identify which site is being referred). Each site 102 is configured with a conference table 104 around which are situated local (or actual) viewing positions S. At the first site 102.1 are seated participants A and B, and at the second site are seated participants C and D. At the first site 102.1 there are two multidirectional display devices Q, located across from the participants A and B (at their respective viewing positions $S_A$ and $S_B$). Display $Q_C$ will display two independently captured image streams of remote participant C seated at actual viewing position $S_C$. Display $Q_D$ will display two independently captured image streams of remote participant D seated at actual viewing position $S_D$. The second site 102.1 has a complementary arrangement, with participants C and D at viewing positions $S_C$ and $S_D$, and display devices $Q_A$ (which will display two independently captured image streams of participant A) and $Q_B$ (which will display two independently captured image streams of participant B). The manner in which these image streams are coupled to the display devices Q will be described below.

At each site 102, there are plural multidirectional image capture systems M, each system comprising a group of image capture devices T. Generally, each image capture device $T_{ij}$ is oriented along a line of sight $L_{ij}$, from a virtual viewing position $V_i$ to an actual viewing position $S_j$. Each system M is associated by designation with one of the viewing positions/participants at the other site. In one embodiment, each image capture device T is configured with a lens that provides approximately the same field of view as the human eye.

At the first site 102.1, image capture device $T_{CA}$ is disposed near or at virtual viewing position $V_C$ and oriented towards viewing position $S_A$ along line of sight $L_{CA}$, and thus captures an image stream of participant A at actual location $S_A$. Notice that image capture device $T_{CA}$ is oriented towards participant A. Likewise, image capture device $T_{CB}$ is oriented along line of sight $L_{CB}$ directly at participant B at viewing position $S_B$ and thus captures an image stream of participant B. Both of these image capture devices $T_{CA}$ and $T_{CB}$ are located at a position corresponding to virtual viewing position $V_C$, and have the same perspective that participant C would see if seated at this virtual position. Thus, image capture device $T_{CA}$ receives an image stream of participant A and image capture device $T_{CB}$ receives an image stream of participant B that preserve the correct perspectives for participant C. Together, these image capture devices $T_{CA}$ and $T_{CB}$ thus form multidirectional image capture system $M_C$.

As illustrated, image capture devices $T_{CA}$ and $T_{CB}$ are situated with respect to display $Q_C$, in a manner that enables proper eye-to-eye contact between participant C and participants A, B. This is because participants A and B will look directly at participant C as she appears on display $Q_C$. This may be done by placing the image capture devices on top of the display device, or by use of a half-silvered mirror arrangement in front of display $Q_C$, or the like.

The configuration for image capture devices $T_{DA}$ and $T_{DB}$ is complementary. Thus, image capture device $T_{DA}$ is also oriented towards viewing position $S_A$ and thus captures an image stream of participant A, and image capture device $T_{DB}$ is oriented towards viewing position $S_B$ and thus captures an image stream of participant B. Notice again that these image capture devices are both oriented directly at participant B. Both of these image capture devices $T_{DA}$ and $T_{DB}$ are located at a position corresponding to virtual viewing position $V_D$, and thus have the perspective that participant D would have of participants A and B if participant D were seated at this virtual position. Also, image capture devices $T_{DA}$ and $T_{DB}$ are situated with respect to display $Q_D$, in a manner that enables proper eye-to-eye contact between participant D and participants A, B.

The second site 102.1 has a complementary configuration of viewing positions S, image capture devices T, and display devices Q. Thus, participant C is seated across from display $Q_A$ on which will be displayed the two image streams of participant A. Participant D is seated across from display $Q_B$, on which will be displayed the two image streams of participant B. Oriented towards participant C are image capture devices $T_{AC}$ and $T_{BC}$, disposed at respective virtual viewing positions $V_A$ and $V_B$. Thus, these image capture devices capture image streams of participant C with the respective proper perspectives that participant A and participant B would have of participant C if seated at the respective virtual viewing locations. Similarly, oriented towards participant D are image capture device $T_{AD}$ and $T_{BD}$, also disposed at disposed at respective virtual viewing positions $V_A$ and $V_B$. Thus, these image capture devices capture image streams of participant D with the respective proper perspectives that participant A and participant B would have of participant D if seated at the respective virtual viewing locations.

The routing of image streams between the two sites 102 is now described. As illustrated in FIG. 2, the image streams that originate from image capture devices $T_{BC}$ are all viewed on a single display $Q_C$. Thus, the image streams from image capture devices $T_{AC}$ and $T_{BC}$ at the second site 102.2 are both routed to display $Q_C$ at the first site 102.1. Similarly, the image streams from image capture devices $T_{AD}$ and $T_{BD}$ at the second site 102.2 are both routed to display $Q_D$ at the first site 102.1.

The complementary routing pertains as well, and the image streams from image capture devices $T_{CA}$ and $T_{DA}$ at the first site 102.1 are both routed to display $Q_A$ at the second site 102.2. Similarly, the image streams from image capture devices $T_{CB}$ and $T_{DB}$ at the first site 102.1 are both routed to display $Q_B$ at the second site 102.2.

Finally, as was mentioned above, each of the multidirectional display devices Q is adapted to concurrently display multiple different image streams at full display width (in other words, not merely side-by-side images), corresponding to the two distinct perspectives of a particular participant at the remote location. A display Q does this by spatially or temporally (or a combination thereof) multiplexing the different images streams across the full width of the display, and directing each image stream in the direction of the appropriate viewing position S for the corresponding participant. Thus, for example, when participant A and participant B both look at display $Q_C$ they see different image streams of participant C, each image stream providing the correct perspective view of participant C. Participant A sees participant C "head on", while participant B sees participant C from C's left side. Similarly, when participant A and participant B look at display $Q_D$, they see different image streams of participant D, each image stream providing a correct perspective view of participant D. Participant A sees participant D from the right side, and participant B sees participant D "head on."

The same effect is true for the participants C and D at second site 102.2, as they look their display devices $Q_A$ and $Q_B$. Participant C sees participant A "head on" on display $Q_A$, while participant D sees participant A from the right side on this display device. Participant C sees participant B from the left side on display $Q_B$, while participant D sees participant B "head on" on display $Q_B$. In all of these cases, the perspective that each participant sees is correct with respect to each of the other remote participants. In addition, each pair of participants thus has the correct perspective for eye-to-eye contact, due to the positioning of the respective image capture devices.

Various embodiments of multidirectional display devices can be used in accordance with the present invention. In all embodiments, the display devices are sufficiently sized to provide approximately life-sized images of the participants. In another embodiment of a display system, one or more video walls are used in which each set of image streams capturing an actual position is displayed on the same portion of a video wall. In another embodiment, high-resolution fixed pixel type displays, such as plasma, LCOS, DLP, or LCD displays can be used for the display devices Q.

In one embodiment, a multidirectional display device Q comprises a spatially multiplexed passive display system that vertically stripes the image streams in repeating sets, and a multi-faceted vertical lenticular lens array, to direct each image stream from a column of the display to the site's actual position for which that image stream includes the view angle. The discussion of FIG. 9 below provides an illustrative example of a simultaneous display of image streams in an embodiment of a spatially multiplexed passive display system.

In another embodiment, a multidirectional display system comprises a temporally multiplexed display system in which associated with each actual viewing position is an active perception device (e.g., active LCD glasses) through which a participant views an image on the display when the device is activated by a directional control signal.

Unlike the system described by Nazakawa, the embodiment of FIG. 2 does not suffer from the improper perspective that results from using a single camera at each virtual viewing position V to capture all of the remote participants. This problem would only be exacerbated by following Nazakawa's suggestion of using one camera for multiple participants where there are more than two participants in each site; such cameras would need a very wide angle lens, which result in a field of view significantly different from the normal field of view of the human eye. The resulting image streams would thus not reflect either the true field of view or the perspective a human participant sees.

Figure 3:
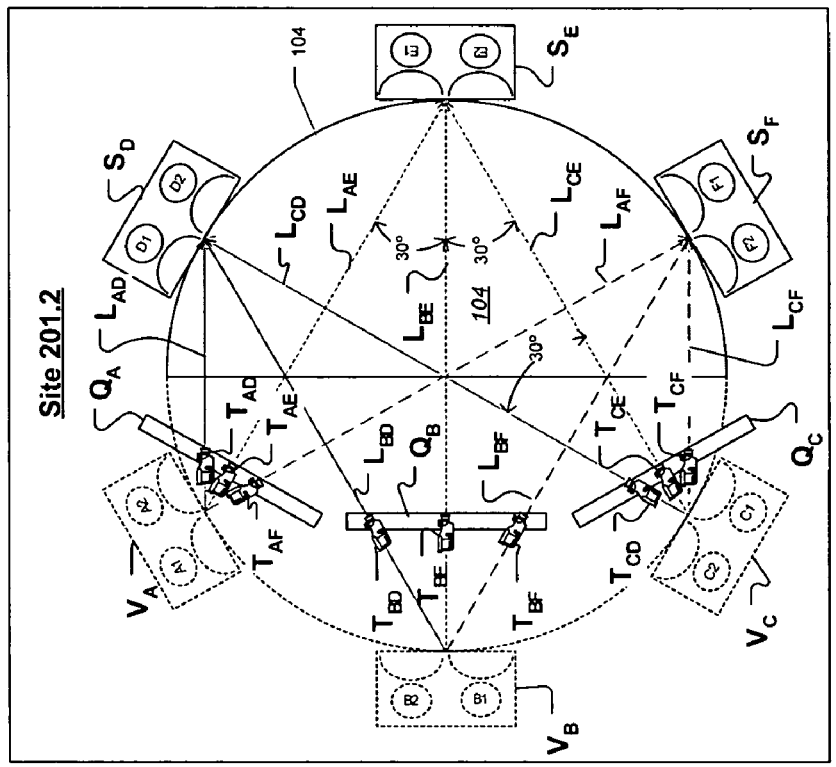
FIG. 3 illustrates a geometrical overview of a system for visual communication between two sites for providing multi-user eye-to-eye interaction between three participants at each site.
Figure 3:
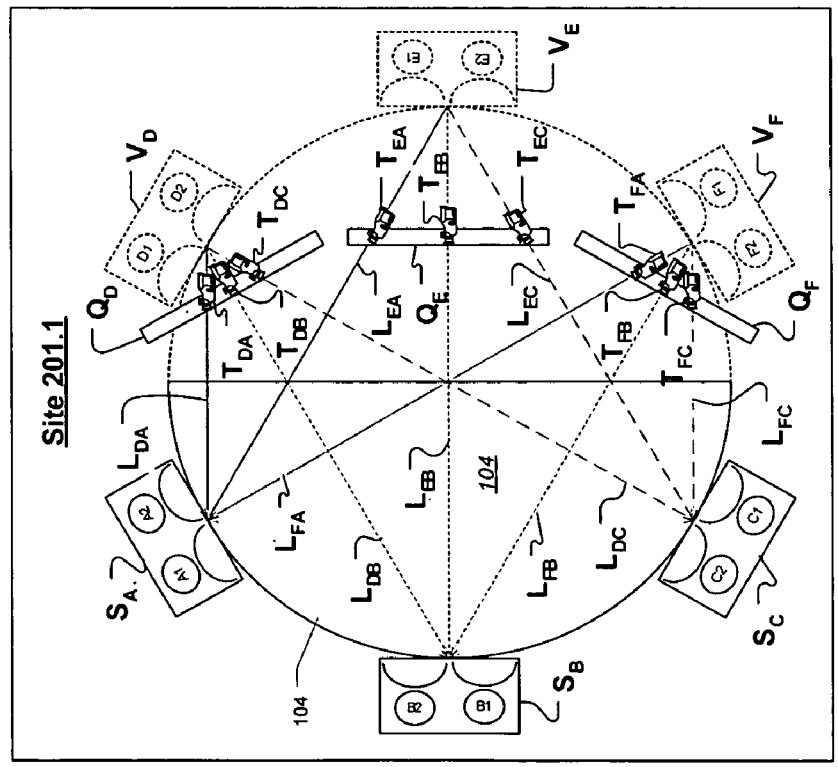

In contrast, the present invention scales quite well to sites having more than two participants each. FIG. 3 illustrates an embodiment of the present invention comprising two sites, each with three viewing positions. The nomenclature used in FIG. 2 is continued here.

At a first site 201.1 (shown on the left side of FIG. 3), there is a semi-circular conference table 104, with viewing positions $S_A$, $S_B$, and $S_C$, at each of which there are two participants (respectively, A1 and A2, B1 and B2, and C1 and C2). Similarly, at the second site (shown on the right side of FIG. 3), there is a conference table 104, also with three viewing positions $S_D$, $S_E$, and $S_F$, at each of which there are two participants (respectively, D1 and D2, E1 and E2, and F1 and F2). The other half of each semi-circular table 104 need not be physically present, and thus is shown in dotted line, to indicate its virtual boundary.

At the first site, across from the viewing positions $S_A$, $S_B$, and $S_C$, there are three display devices $Q_D$, $Q_E$, and $Q_F$, which will respectively shown the image streams of the three viewing positions $S_D$, $S_E$, and $S_F$. These display devices are respectively positioned to correspond with the virtual viewing positions $V_D$, $V_E$, and $V_F$, in the same manner as described above. The virtual viewing positions and the remote participants are shown in dotted lines to indicate that they are not physically present at the respective sites. Thus, local participants A, B, and C will look at display $Q_D$, for example, to view the image stream of remote participant D seated at position $S_D$, and each of the local participants, will see the remote participants from the proper perspective.

Likewise at the second site, across from viewing positions $S_D$, $S_E$, and $S_F$ are three display devices $Q_A$, $Q_B$, and $Q_C$, which will respectively show the image streams of the three viewing positions $S_A$, $S_B$, and $S_C$. Also, there are three virtual viewing positions $V_A$, $V_B$, and $V_C$ situated in the same manner as described for the first site.

The arrangement of image capture devices in this embodiment is as follows. In general, each combination of a virtual viewing position $V_i$ and actual viewing position $S_j$ is associated with the image capture device $T_{ij}$, disposed at or near the virtual viewing position $V_i$ and directed along a line of site $L_{ij}$ towards the actual viewing position $S_j$. In this manner, each image capture device captures an image stream of the participants at actual viewing position $S_j$ with the correct perspective and eye-to-eye contact that another participant would have if seated at virtual viewing position $V_i$. Again, a group of image capture devices $T_{ij}$ associated with a virtual viewing position $V_i$ forms a multidirectional image capture system $M_i$.

More specifically then, at the first site 201.1, a first group of image capture devices $T_{DA}$, $T_{DB}$, and $T_{DC}$ are positioned near the virtual viewing position $V_D$, which represents the actual viewing position of $S_D$ at the second site 202.2. Image capture device $T_{DA}$ is oriented along a line of sight $L_{DA}$ from virtual viewing position $V_D$ towards actual viewing position $S_A$. Image capture device $T_{DB}$ is oriented along a line of sight $L_{DB}$ from virtual viewing position $V_D$ towards actual viewing position $S_B$. And image capture device $T_{DC}$ is oriented along a line of sight $L_{DC}$ from virtual viewing position $V_D$ towards actual viewing position $S_C$. Notice that unlike the positioning of the image capture devices in FIG. 2, here the image capture devices need not be closely situated next to each other, but rather can be spaced apart so as to be disposed along the appropriate line of sight between the virtual viewing position and the specific actual viewing position for that image capture device.

This pattern of positioning and orientation is repeated for each of the remaining two virtual viewing positions at the first site 202.1, and then complemented at the three virtual viewing positions at the second site 202.2 as illustrated in FIG. 3.

In this illustrated embodiment, the display devices $Q_D$, $Q_E$, and $Q_F$ at the first site 201.1 are each oriented so that the normal to the display surface at the horizontal center of the display intersects actual viewing position $S_B$, that is all of the displays are oriented more or less directly at $S_B$. Likewise, each of the display devices $Q_A$, $Q_B$, and $Q_C$ at the second site 201.2 is oriented so that the normal to the display surface at the horizontal center of the display intersects actual viewing position $S_E$, that is all of the displays are oriented directly at $S_E$. This arrangement is beneficial when considered in conjunction with the orientation of the image capture devices T. One benefit is that the lines of sight from the image capture devices to the actual viewing positions are substantially coincident with the view lines from the actual seating positions to the display devices themselves. This ensures proper eye-to-eye contact between each local participant and each remote participant. The other aspect of note is that the 30° angle between adjacent lines of sight in each group of image capture devices matches the 30° between adjacent view lines from each actual viewing position to the three display devices, providing a highly symmetrical relationship which further creates the ambiance of a virtual environment in which all participants are present in a common space.

The routing of the image capture devices to the respective display devices follows generally the same pattern of cross-connectivity as described with respect to FIG. 2. Schematically, each local display $Q_i$ receives the image streams from three remote image capture devices $T_{ji}$, where i designates the remote actual viewing position being imaged, and j is each of the local actual viewing positions. More specifically, the routing of signals from image capture devices to display devices is described in the following two tables:

| First Site 202.1 Display Device | Second Site 202.2 Image Capture Devices |
| --- | --- |
| $Q_D$ | $T_{AD}$, $T_{BD}$, $T_{CD}$ |
| $Q_E$ | $T_{AE}$, $T_{BE}$, $T_{CE}$ |
| $Q_F$ | $T_{AF}$, $T_{BF}$, $T_{CF}$ |

| Second Site 202.2 Display Device | First Site 202.1 Image Capture Devices |
| --- | --- |
| $Q_A$ | $T_{DA}$, $T_{EA}$, $T_{FA}$ |
| $Q_B$ | $T_{DB}$, $T_{EB}$, $T_{FB}$ |
| $Q_C$ | $T_{DC}$, $T_{EC}$, $T_{FC}$ |

As can be seen in these tables, each display $Q_i$ receives images streams from the three separate image capture devices T oriented towards a given actual viewing position at the remote site. Each display Q is adapted to directionally output the received image streams differentially towards each of the respective actual viewing positions S at the local site, so that the participants at each actual viewing position see only the image stream for the group of image capture devices T associated with their actual viewing position. This ensures that each local participant viewing this image capture device sees the image stream with the appropriate perspective of the remote participants, depending on their actual viewing position S.

For example, at the first site 201.1, all of the local participants observe remote participants D1 and D2 on display $Q_D$. Local participants A1 and A2 see the image stream from image capture device $T_{AD}$, which shows participants Q1 and Q2 from their right side. Local participants B1 and B2, however, observe display $Q_D$ and see the image stream from image capture device $T_{BD}$ that shows participants D1 and D2 essentially "head on". Local participants C1 and C2 observe display $Q_D$ and see the image stream from image capture device $T_{CD}$ that shows participants D1 and D2 from their left side. In each case, the local participants see the remote participants with the correct perspective and with the appropriate eye-to-eye contact. This perspective preserving configuration is obviously repeated with each of the other display devices at both the local and remote sites. Overall, all twelve participants see the other participants at the remote site with perspective correct eye-to-eye contact. The particular implementation of the multidirectional display devices is further described below.

FIG. 3 illustrates the complementary site configurations 202.1 and 202.2 in which the arrangements of actual viewing positions share the same geometry of a half-circle. As is apparent from the illustration of FIG. 3, the combination of these two sites 202 together creates a virtual environment in which the remote participants essentially appear to be seated across a circular conference table from the local participants. In other embodiments, the arrangement of actual viewing positions at different sites can be different. For example, the actual positions $S_A$ and $S_C$ can be rotated so that they each face more directly towards the central axis from the center of position $S_B$ to the center of virtual position $V_E$. Such an arrangement may be useful when an audience in a conference room at the second site 202.2 is remotely viewing a panel of speakers arranged in the half-circle arrangement of the first site 202.1. However, the complementary configurations further another goal of providing the sense of being in the same physical environment for participants remotely located from each other. The site configuration can further enhance the illusion of a virtual environment by providing a visual extension of the site, using similar features, such as furniture and colors, in each of the site configurations.

Pre-defined arrangements of actual viewing positions sharing the same geometry, in this example equally spaced positions around a virtual circle facilitate determination of each capture angle for each image capture device and determination of position for each multidirectional display. However, other embodiments can include asymmetrical arrangements. An example of an asymmetrical arrangement is an unequal number of actual viewing positions at participating sites. Another example is an arrangement including actual viewing positions that are not equally spaced apart.

In the various embodiments, the angular disparity between the lines of sight of the image streams is significantly greater than an angle (e.g., 4-6 degrees) typically used in auto-stereoscopic displays in order to achieve stereoscopic disparity. In a conventional stereoscopic system, two cameras are oriented at a specific location and the angle between the lines of sight of the two cameras is about 4-6 degrees, depending on the distance of the cameras to the location. Maintaining this small difference is necessary in order to obtain image streams that will simulate stereovision when viewed by a single viewer. By contrast, in the embodiment of FIG. 3, it can be readily seen that for a group of image capture devices $T_{AD}$, $T_{BD}$, $T_{CD}$, the angular disparity between their respective lines of sight is about either 30° or 60° (depending on the pair of image capture devices being considered). The result, of course, is that the resulting image streams do not create a stereoscopic impression, and are not intended to, since each stream is to be viewed from a separate actual viewing position.

Figure 4A:
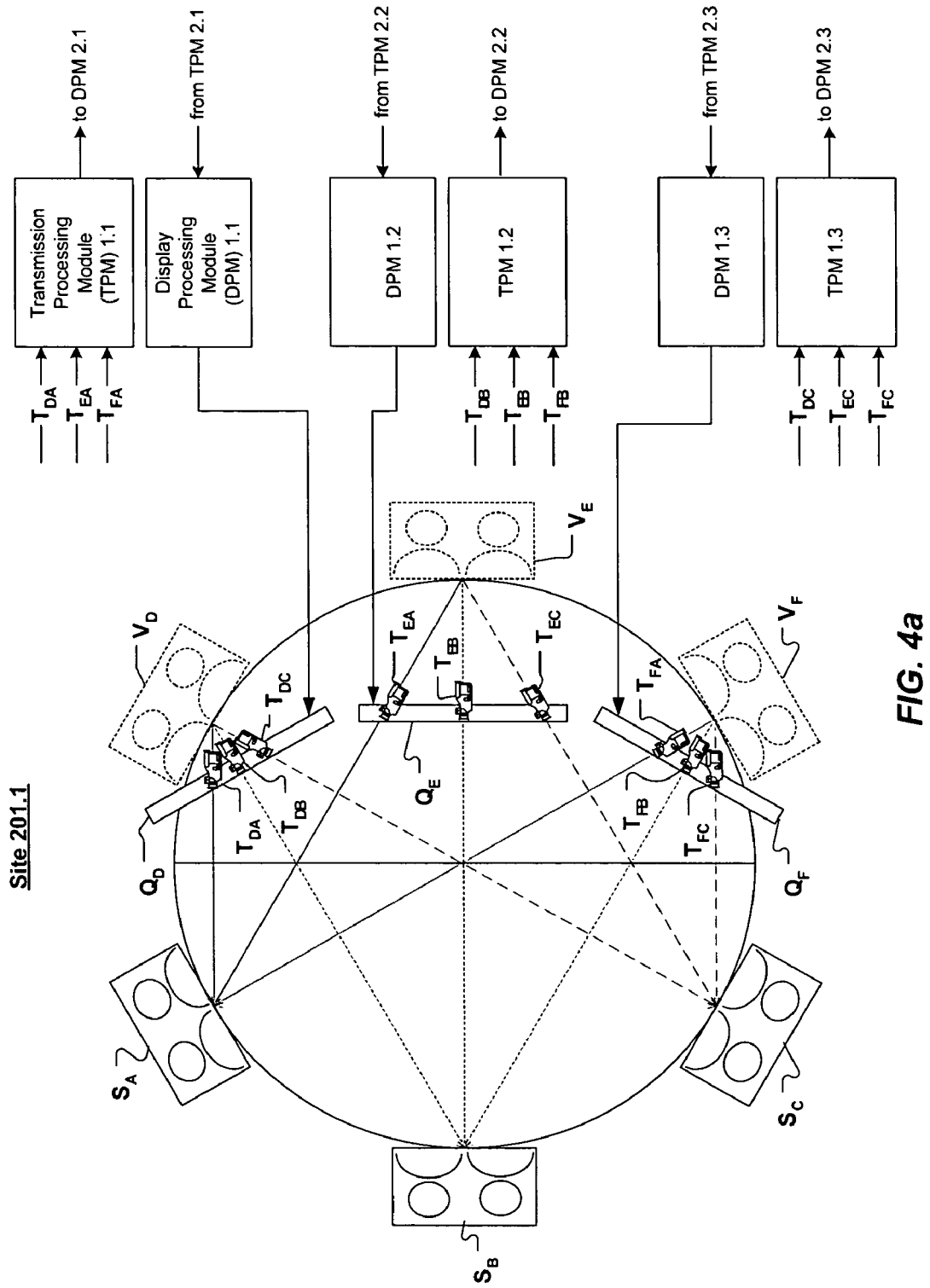
FIGS. 4a and 4b illustrate the connectivity of the image capture and image processing elements for a system corresponding to that shown in FIG. 3.
Figure 4B:
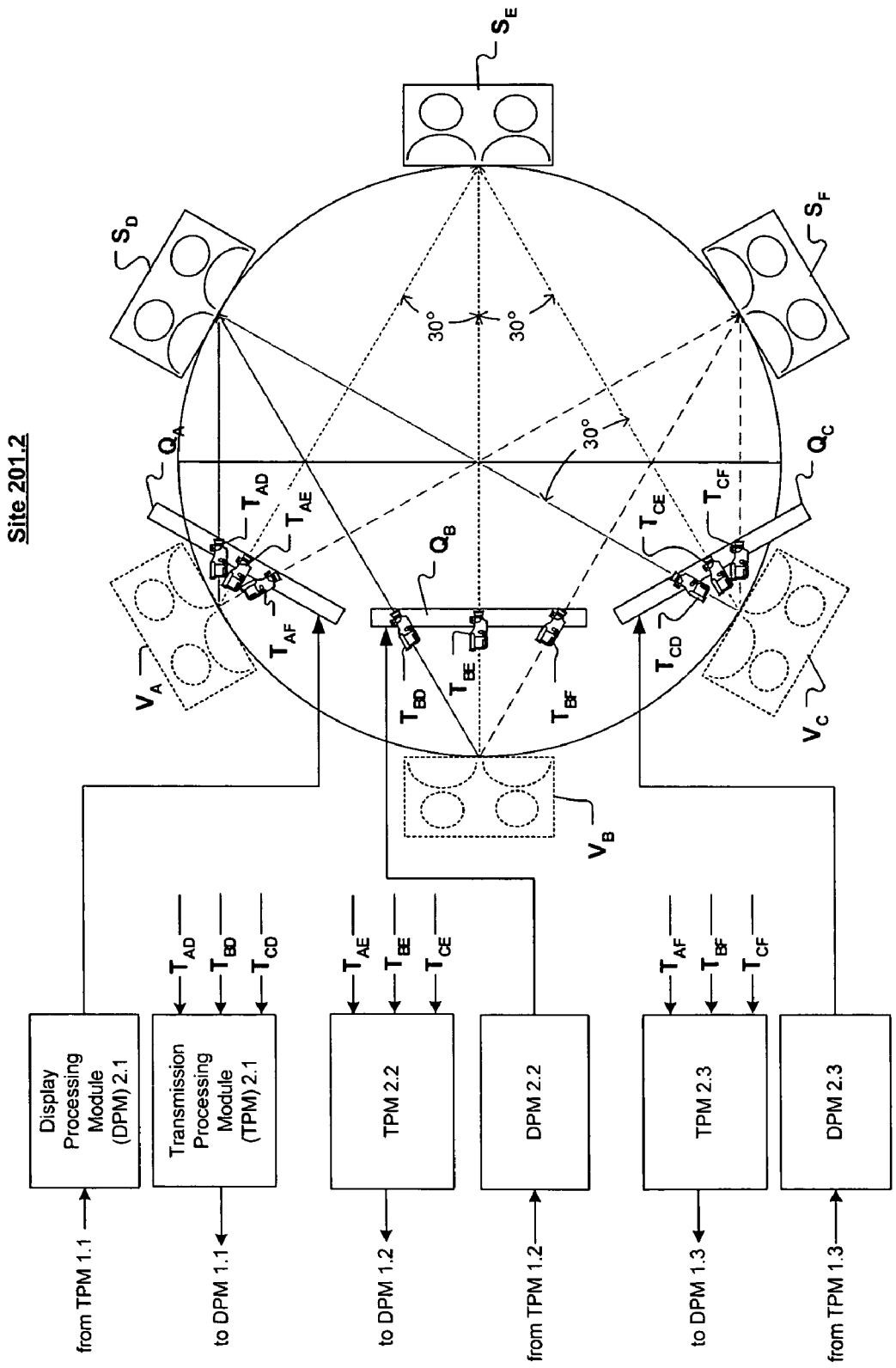

FIGS. 4a and 4b illustrate the connectivity aspects of the system illustrated in FIG. 3 in more detail. Each site 201 includes a plurality of transmission processing modules (TPM) and display processing modules (DPM). The TPMs at the first site 201.1 are designated as TPM 1.1, 1.2, and 1.3; likewise the DPMs at the first site 201.1 are designated DPM 1.1, 1.2, and 1.3. Each multidirectional image capture system distributes the set of image streams it captures to three different TPMs, corresponding to the display device to which the streams are to be sent. Thus, at the first site 201.1, the image streams from image capture devices $T_{DA}$, $T_{DB}$, and $T_{DC}$ are distributed to TPM 1.1, TPM 1.2, and TPM 1.3 respectively. The same is true for each of the remaining six image streams at the first site 201.1. Another way of saying this is that each TPM collects the image streams from the three image capture devices, which will be displayed, on a same multidirectional display device at the remote site. Thus, the three image streams that TPM 1.1 receives are transmitted to DPM 2.1 at the second site 201.2, for display on multidirectional display $Q_A$. Similarly, TPM 1.2 transmits its received image streams to DPM 2.2 for display on multidirectional display $Q_B$, while TPM 1.3 transmits its received image streams to DPM 2.3 for display on multidirectional display $Q_C$. Of course, the complementary arrangement is established for the image streams originating at the second site 201.2 and being transmitted from TPMs 2.1, 2.2, and 2.3 to corresponding DPMs 1.1, 1.2, and 1.3, for display on multidirectional display devices $Q_D$, $Q_E$ and $Q_F$, respectively.

Each TPM can include logic for processing the signals for transmission such as a multiplexer for interleaving the streams, and a network interface. In addition to transmitting the set of image streams over the network, each TPM can include image-processing logic. The logic can be embodied in various ways including hardware, software, firmware or a combination thereof. An example of image processing logic can include logic for transforming video input from one format to another format (e.g., NTSC to PAL, or field-to-frame de-interlacing). Other examples includes logic for image compression, for example compressing the image streams in MPEG-2, automatic color balance, geometry correction, and the like. Each DPM is communicatively coupled to a respective multidirectional display device Q for which it processes the set of image streams for a multidirectional display format, and controls display of the set of image streams on the display. The TPMs and the DPMs in each site have been illustrated separately for clarity only. Depending on the embodiments, the functionality of these modules can be combined in whole or in part. The network can be one of numerous embodiments, some examples of which are the Internet, an intranet, a broadcast medium, a cable system, a wireless network, or a local area network.

Figure 5:
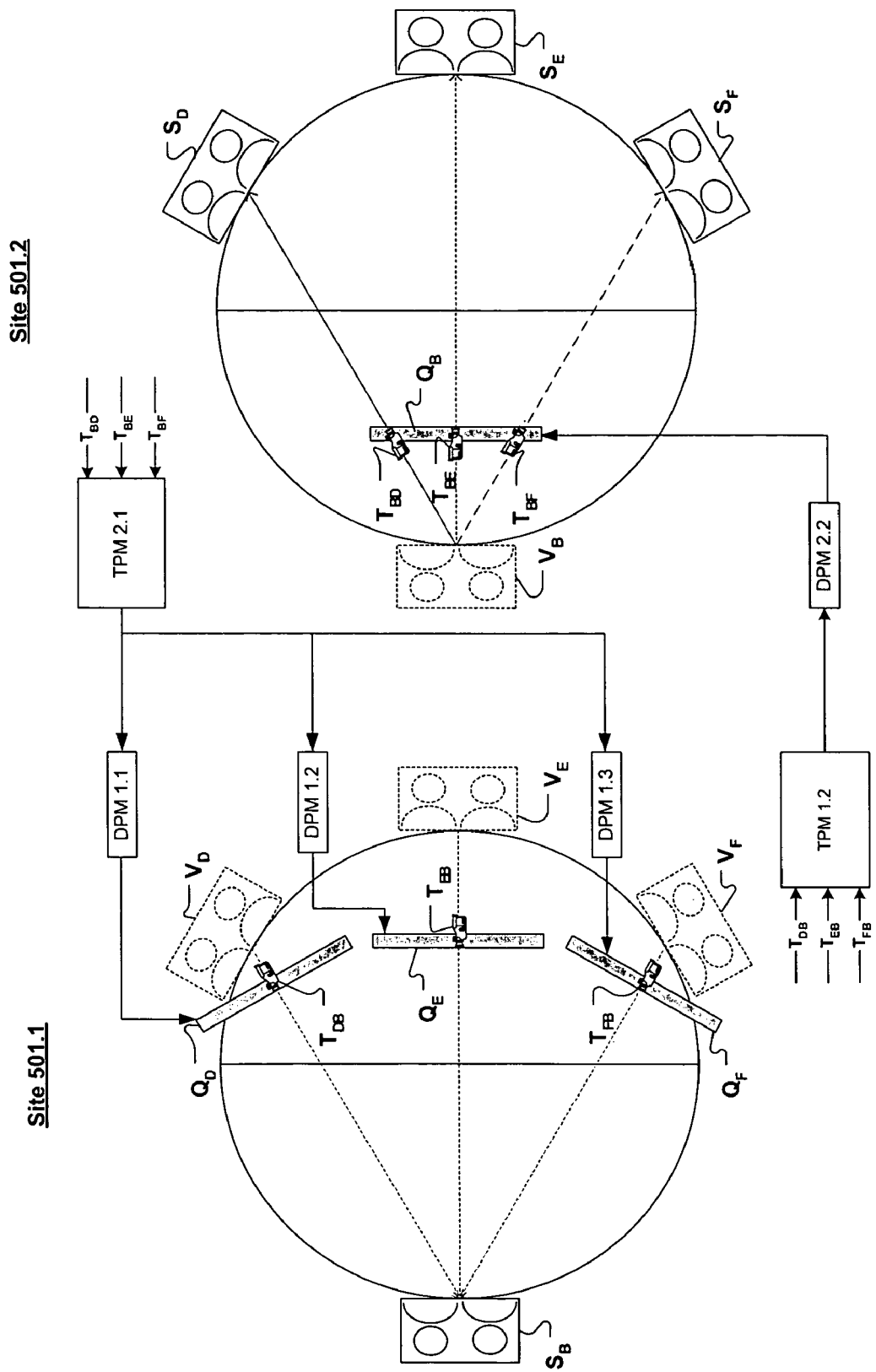
FIG. 5 illustrates an asymmetrical system configuration for visual communication between two sites.

In other embodiments, the sites can have asymmetric configurations. FIG. 5 illustrates one embodiment of an asymmetric configuration. The operation of the elements of this configuration should now be apparent from the foregoing illustrations and descriptions of FIG. 2, 3, 4a, and 4b.

Implementation

An image capture device T can be video capable imaging system. Generally, the image capture devices are CCD cameras, though other types of cameras can be utilized as well. A specific implementation example of a CCD camera that can be used is a Hitachi HV-D5W (640×480) having a ⅔"3 CCD camera, a Fujinon HA13×4.5BEMD lens, and a NTSC RS-170 s-video output. In the illustrated embodiments, the image capture devices are video cameras, and are adjusted to the same references for characteristics to provide consistent images from device to device. Examples of characteristics are scale, color and focus.

Figure 6:
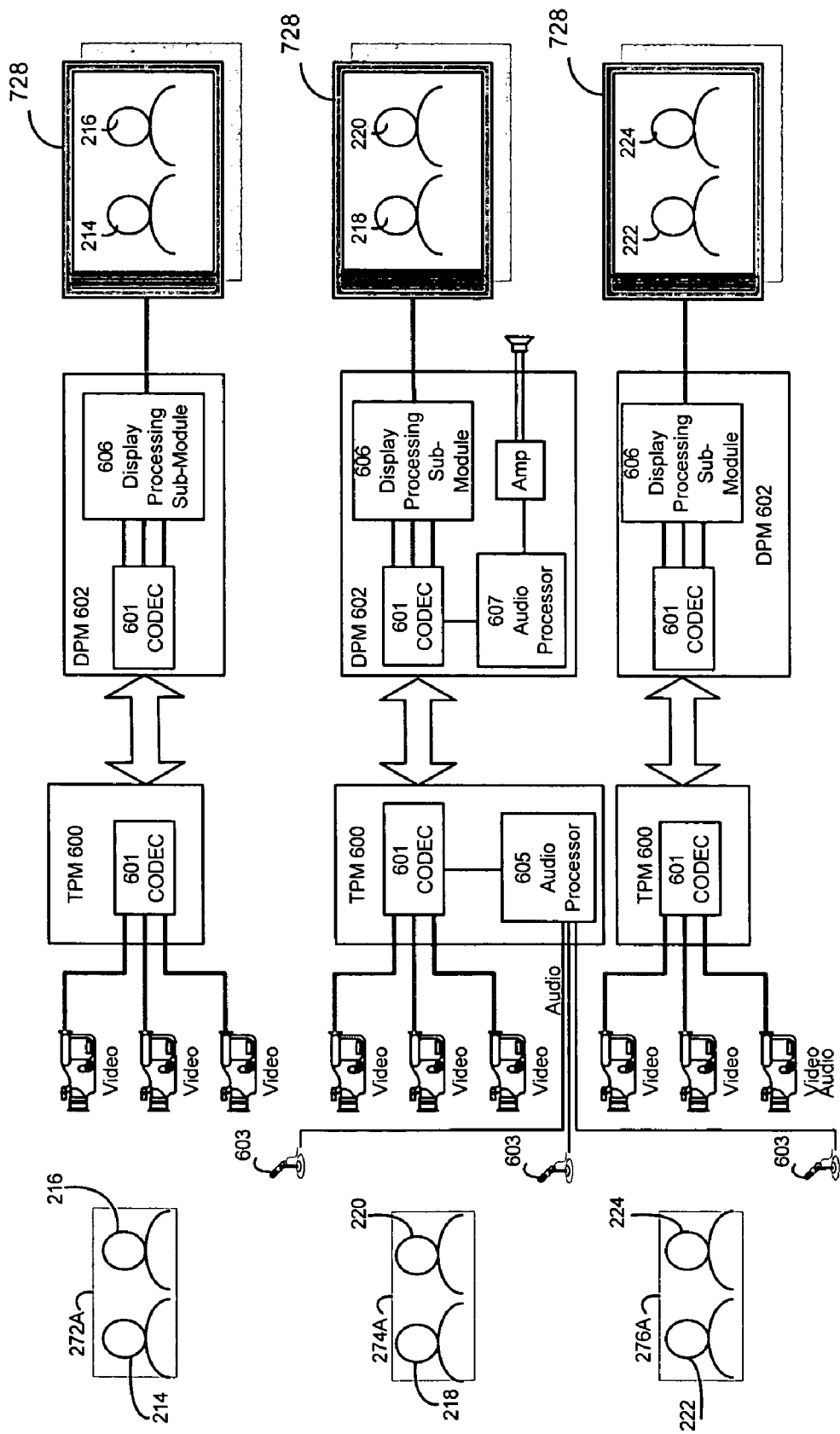
FIG. 6 illustrates the overall signal processing chain for a system in accordance with FIGS. 4a and 4b.

FIG. 6 illustrates the overall signal processing chain in the context of the system illustrated in FIGS. 4a and 4b. Each TPM 600 includes a codec for performing encoding of its respective received set of image streams. An implementation example of a codec that can be used is a standard low latency (e.g., <250 ms round trip) MPEG-2 codec; other types of codecs, including AVC/H.264, and H.263 codecs may also be used. At least one TPM 600 further comprises an audio processor 605 that can convert the analog audio signals generated by microphones 603 at the respective actual viewing positions into digital audio signals, which are encoded and multiplexed, and compressed if desired, by the codec as well. The video and audio signals can be encoded and compressed in other formats as well. In another embodiment of a TPM, it can receive and transmit signals from all or a larger subset of the cameras used to capture the image streams.

Each DPM 602 comprises a codec 601 for receiving, demultiplexing and uncompressing, if necessary, a set of image streams from a respective TPM 600 as well as a display processing sub-module 606 communicatively coupled to the codec 601 for processing the set of image streams for a multidirectional display format and displaying the set of image streams on the same multidirectional display device 610. Each set of image streams represents multiple different perspectives or views of the same actual viewing position. Each image stream in the set captures the viewed position at the view angle of its corresponding actual position at the receiving site. Each DPM 602 processes these multiple views for display on one of the multidirectional display devices.

Figure 7:
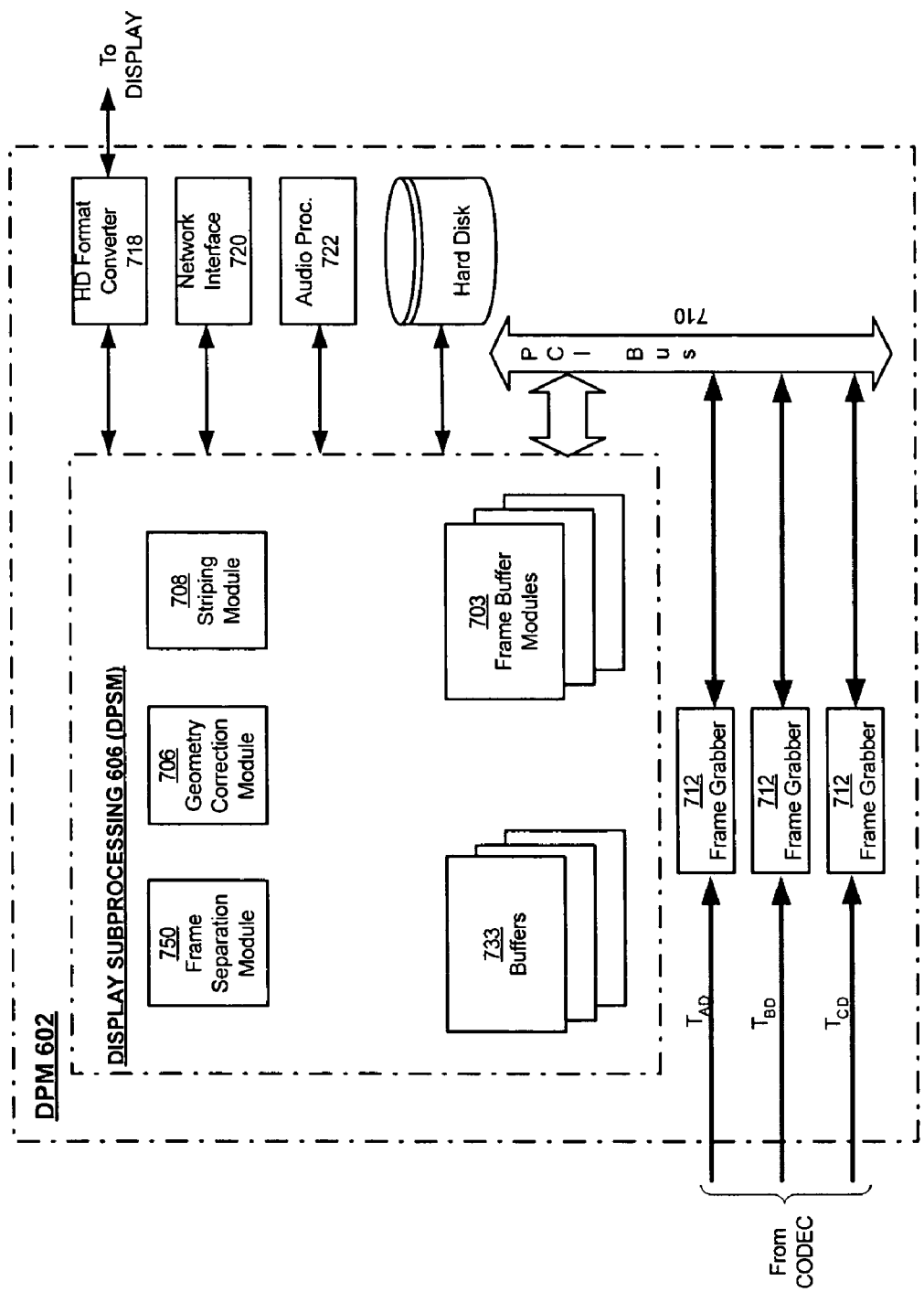
FIG. 7 illustrates a display processing module.
Figure 8:
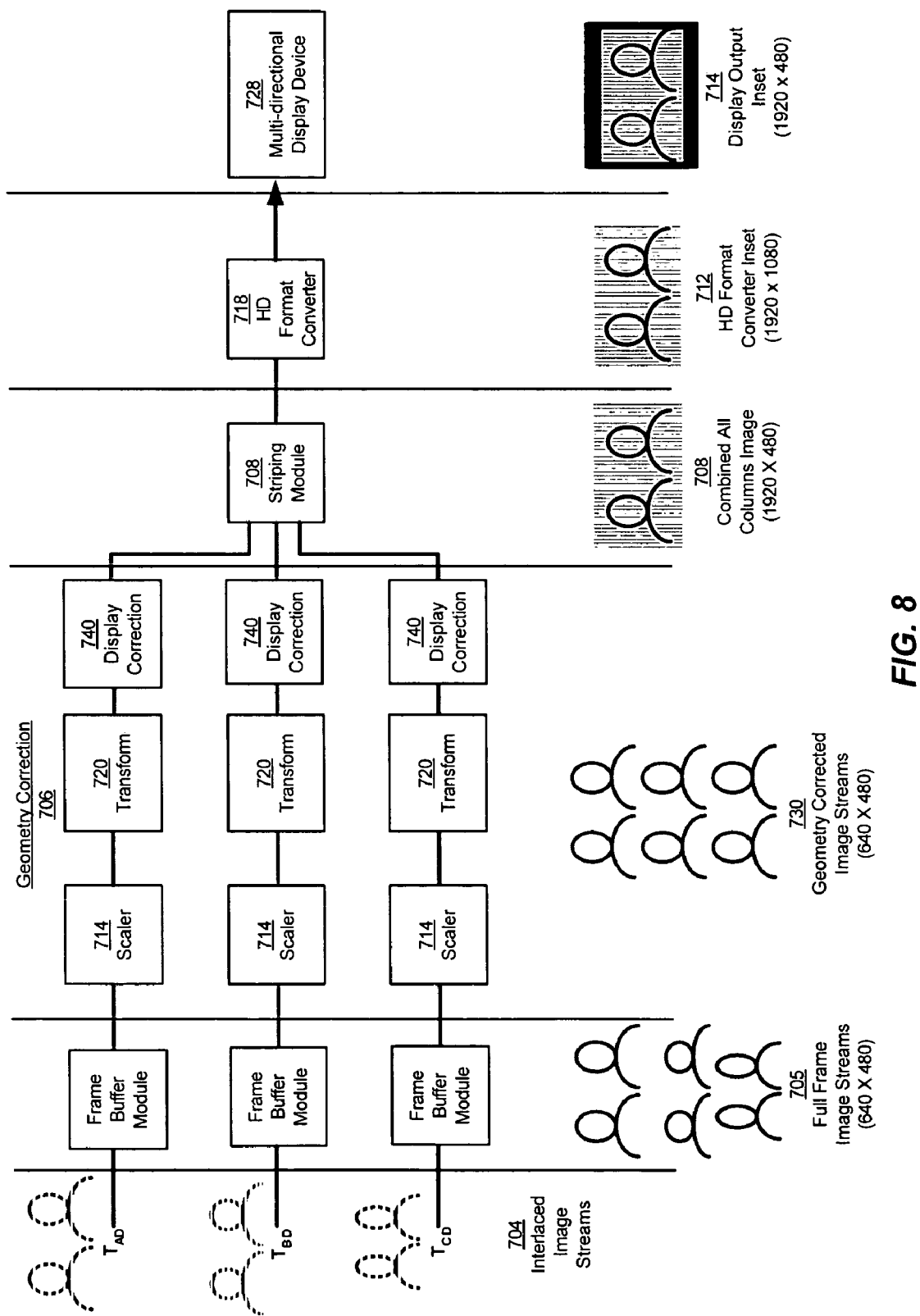
FIG. 8 illustrates a data flow diagram for processing a set of image streams for presentation on the same multidirectional display using spatial multiplexing.

FIG. 7 illustrates an embodiment of a DPM 602 in more detail. A DPM 602 includes a display processing sub-module 606 in accordance with an embodiment of the present invention. FIG. 8 illustrates a data flow diagram for processing the images streams by a DPM 602, for example the images streams received by the DPM from image capture devices $T_{AD}$, $T_{BD}$ and $T_{CD}$ via a TPM. The operation of the other DPMs is similar with their respective image streams.

The DPM 602 includes a display processing sub-module (DPSM) 606 communicatively coupled to hard disk 724, an audio processor 722, network interface 720, high definition (HD) format converter 718, and, via bus 710, to a plurality of frame grabbers 712. The number of frame grabbers providing input is at least as many as the number of actual positions at the displaying site in which viewers are situated during a communication session. Each frame grabber 712 receives from the codec respective image streams of a set of image capture devices T, in this example the image streams generated by $T_{AD}$, $T_{BD}$, and $T_{CD}$ in FIG. 3.

The DPSM 606 further comprises frame buffer module 703 for each frame grabber 712 from which it retrieves video data such as interlaced images streams 704 illustrated in FIG. 8, from its respective frame grabber 712 responsive to interrupts. This interrupt-driven architecture insures that data is collected in a timely manner without data loss. Each frame buffer module 703 reads the digitized video date from its respective frame grabber and stores the data into respective buffer 733 (e.g., a ring buffer). By using a buffer, the display module provides latitude in processing subsequent frames. In this embodiment, each frame buffer module 703 provides progressive full frame image 705.

As can be seen in FIG. 8, the image stream 704 from camera $T_{AD}$ currently in its frame buffer 733 appears to have the correct aspect ratio while image stream from camera $T_{BD}$ is stretched horizontally, and image stream from camera $T_{CD}$ appears stretched vertically. The DPSM 606 further comprises geometry correction module 706, for applying geometry correction algorithms to eliminate or at least decrease optical and physical differences in the video images of the set of image streams due to the use of separate cameras at varying distances from the actual position that they image. The goal is to have the images from the cameras $T_{AD}$, $T_{BD}$ and $T_{CD}$ appear as if being captured by the same camera. This insures that subsequent processing uses similar sized images. While ideally, the mechanical adjustments of the camera provide coarse registration, these processing blocks allow for finer adjustments for better image matching. The geometry correction module 706 may be implemented in software, hardware or firmware or a combination and different versions (e.g. processes) of the geometry correction module 706 can be operated in parallel to process all the image streams in the set at or near the same time.

The geometry correction module 706 applies, as illustrated in FIG. 8, scaling algorithm 714, transform algorithm 720 and display correction algorithm 740. Scaling accounts for camera image differences such as zoom. This insures that the image size is consistent from camera to camera. The transform processing 720 provides an x-y correction to center the images relative to each other. Display correction 740 accounts for the differences in the actual display angle. Note that the image the viewer is seeing is either direct view (perpendicular) or offset (angled). When the display is angled relative to the viewer, the image needs to be widened in order to account for the angle. The geometry correction module 706 applies display correction algorithms 740 for stretching the image where appropriate to account for the angle of view from a particular actual viewing position. The resulting image streams 730 have been corrected so that they now appear to have all been captured by the same image capture device.

The DPSM 606 further comprises a striping module 708 that receives the separate, corrected image streams and interleaves them into columns that will be aligned with respective lenticular lens facets angled to provide the correct view for each actual viewing position at the displaying site. Together the striping module 708 in conjunction with lenticular lenses of the multidirectional display device 728 provide images with the correct view angle for the local participants. The interleaving of the image streams into a single image stream serves to allow for the concurrent display of the image streams.

In the example of FIG. 8 in which three image streams are concurrently displayed in three different directions on the same multidirectional display device 728, one for each actual viewing position $S_A$, $S_B$ and $S_C$, the striping module 708 can process the data in a variety of ways. One way is to retain all of the video image (640×480) from each camera $T_{AD}$, $T_{BD}$, $T_{CD}$, resulting in a composite video image 708 (1920×480) larger than the original captured images. This is desired in order to allow each viewing position to maintain their respective image stream at standard definition. Another way is to keep only 1 of every 3 columns of each image stream, and create a combined signal that still complies with a standard video resolution (640×480). While the latter approach allows for standard lower cost equipment to be used, the result is also lower in resolution.

The corrected, interleaved image streams are sent to a High Definition (HD) Format Converter 718 which can be implemented on a HD graphics card which drives multidirectional display device 728. The HD format converter 718 can include transcoding hardware for providing display hardware dependency such as scaling, letterboxing, and offset for geometry correction of the displayed image as well. This also provides the real-time data transfers from the processed video data to the graphics display system.

The HD format converter 718 formats the data from the combined 1920×480 to a standard viewable HD image 712 at 1920×1080 resolution. This may require a non-standard 2.25 up-convert. In order to keep the processing time minimal, the up-convert is achieved by line replication (2×) and the remaining correction (1.25×) is achieved using the adjustment of the display. The output image 714 is a 1920×480 image letterboxed within a 1920×1080 signaling in this example. The image streams are striped on the display in the order of the stream from camera $T_{AD}$ to the stream from camera $T_{BD}$ to the stream from camera $T_{CD}$ so that the left to right view of actual position $S_D$ at the second site is the same for the participants at actual viewing position $S_A$, $S_B$ and $S_C$ at the first site as if they were seated across the full circular table in the same room as participants at $S_D$.

In one implementation example, the display used in the passive system is a high resolution plasma display. An example of a high resolution display is one capable of displaying a 1920×480 image so that each of the three image streams appears in a column on the display. Alternatively, a standard TV resolution (640×480) display can be used in which sub-sampling of the image streams is employed. For example, only one of every three columns of a set of image streams is kept for creating a combined signal that is still a standard video definition of (640×480).

Figure 9:
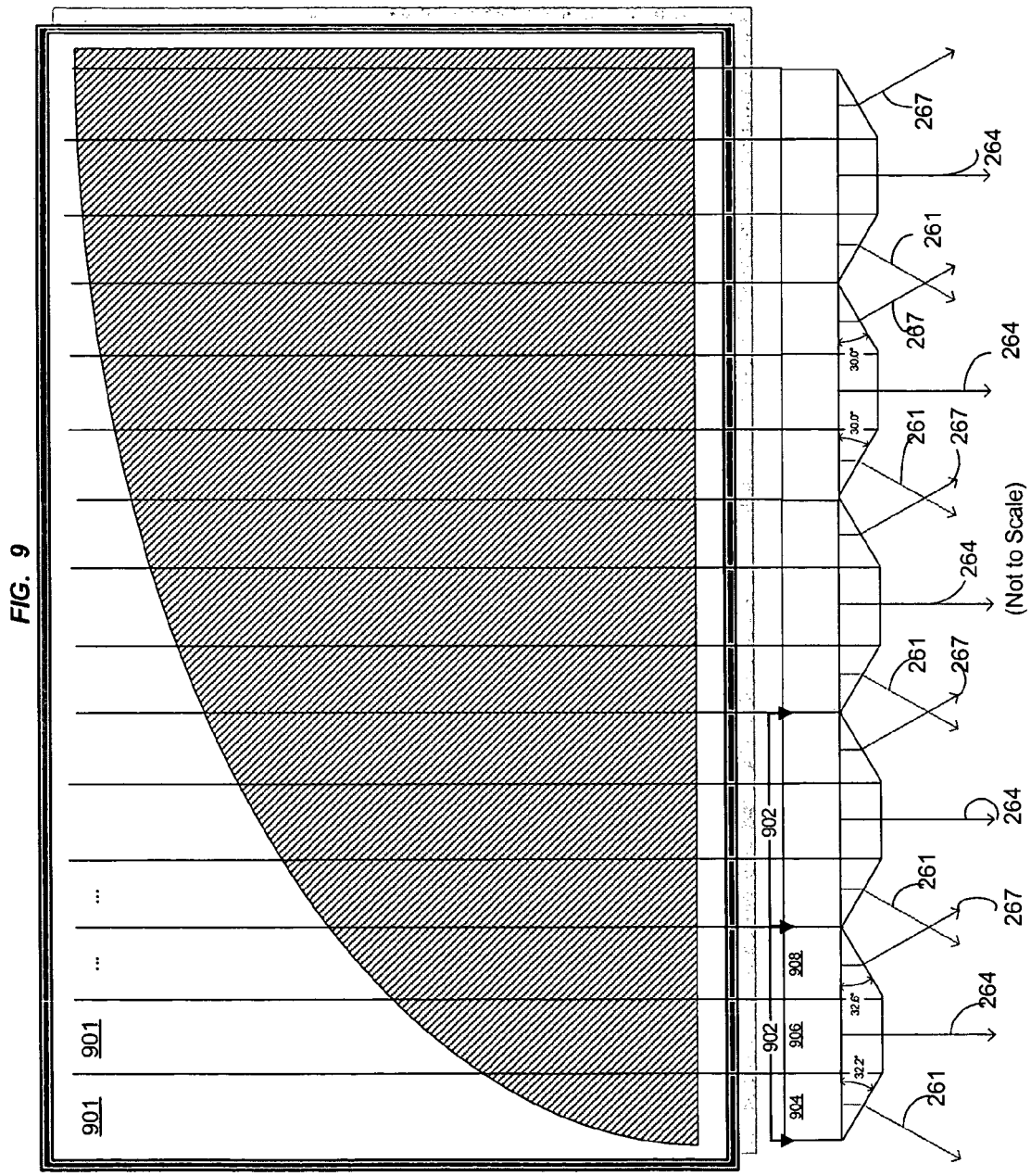
FIG. 9 illustrates a matching of display columns, each including a striped portion of an image stream, to a lenticular lens facet for each column in accordance with an embodiment of the present invention.

FIG. 9 illustrates a matching of the display columns in an enlarged view of image 714 on display 728, for the illustrated data flow in FIG. 8. The shaded area depicts the right shoulder portion of a participant's image. The display 728 includes a lens array across the full width of the display, comprising a plurality of vertical lenticular lenses 902. Each lenticular lens 902 in this example includes three angled facets 904, 906, 908. Each facet 902 is angled so that the column portion 901 to which it is aligned will only be displayed in the direction towards the actual viewing position having the matching view angle, given the position of the display device itself. On each lenticular lens 902, a left facet 904 is shaped to direct to the corresponding image column 901 from camera T along line of sight 261 which is at a 30 degree angle to the left of the center normal axis 264 of display device. Similarly, a right facet 908 is shaped to direct the corresponding image column from camera T along line of sight 267, which is at a 30 degree angle to the right of center normal axis 264. Finally, each center facet 906 is shaped to direct the corresponding image column 901 from camera T along line of light 264. Again, although the multidirectional display is displaying a composite of three images, because of the angled facets of the lenticular lens, participants at each viewing position only see the one image stream that corresponds to their viewpoint of the displayed participants in the virtual environment. The angles between the adjacent lines of sight 261, 264, 267 are greater than stereoscopic disparity angles used in conventional autostereoscopic displays so that a separate non-stereoscopic view of each image stream is directed along each line of sight 261, 264, 267 respectively to each of the actual positions $S_A$, $S_B$ and $S_C$. In another embodiment, instead of straight angled facets, a lenticular lens can have a curved surface to direct each image stream at its angular offset from the display to its corresponding actual position. It is further noted here, that the alignment of the facets 908 to the columns 902 is illustrated as being substantially vertically coincident for ease of explanation; in practice it may be desirable to offset the facets from the columns to achieve the desired output angles.

For the site configuration embodiment in FIG. 2, wherein each site has two participants, one DPM 602 processes the image streams from each pair of cameras $T_{CA}$ and $T_{DA}$, $T_{CB}$ and $T_{DB}$, $T_{AD}$ and $T_{BD}$, $T_{AC}$ and $T_{BC}$, in the same manner as discussed above, except that only two streams need to be processed in each set. Striping or interleaving two (640×480) images can be done in two ways. One way is to combine the two images resulting in a composite (1280×2024) image, and the second is to drop every other column from the original image (320×480) and combine these to result in an image that is the same resolution (640×480). The striping module 708 alternates between two image streams, e.g., $T_{AD}$ and $T_{BD}$, forming a display column pattern of $T_{AD}$, $T_{BD}$, $T_{AD}$, $T_{BD}$, $T_{AD}$, $T_{BD}$ . . . . In the example of FIG. 9, each lenticular lens 802 is configured to include two lenticular facets 804 and 806 side by side, facet 804 directing the image stream at a selected angle to the left of the normal axis of the display, and facet 806 directing the image stream at a selected angle to the right of the normal axis.

The DPSM 606 further comprises a frame separation module 750 that can be used in an alternative embodiment for an active multidirectional display system not using striping. The frame separation module 750 alternates for display a full image processed from each image stream in coordination with a control signal directed at a perception device or devices of the appropriate actual position.

Figure 10:
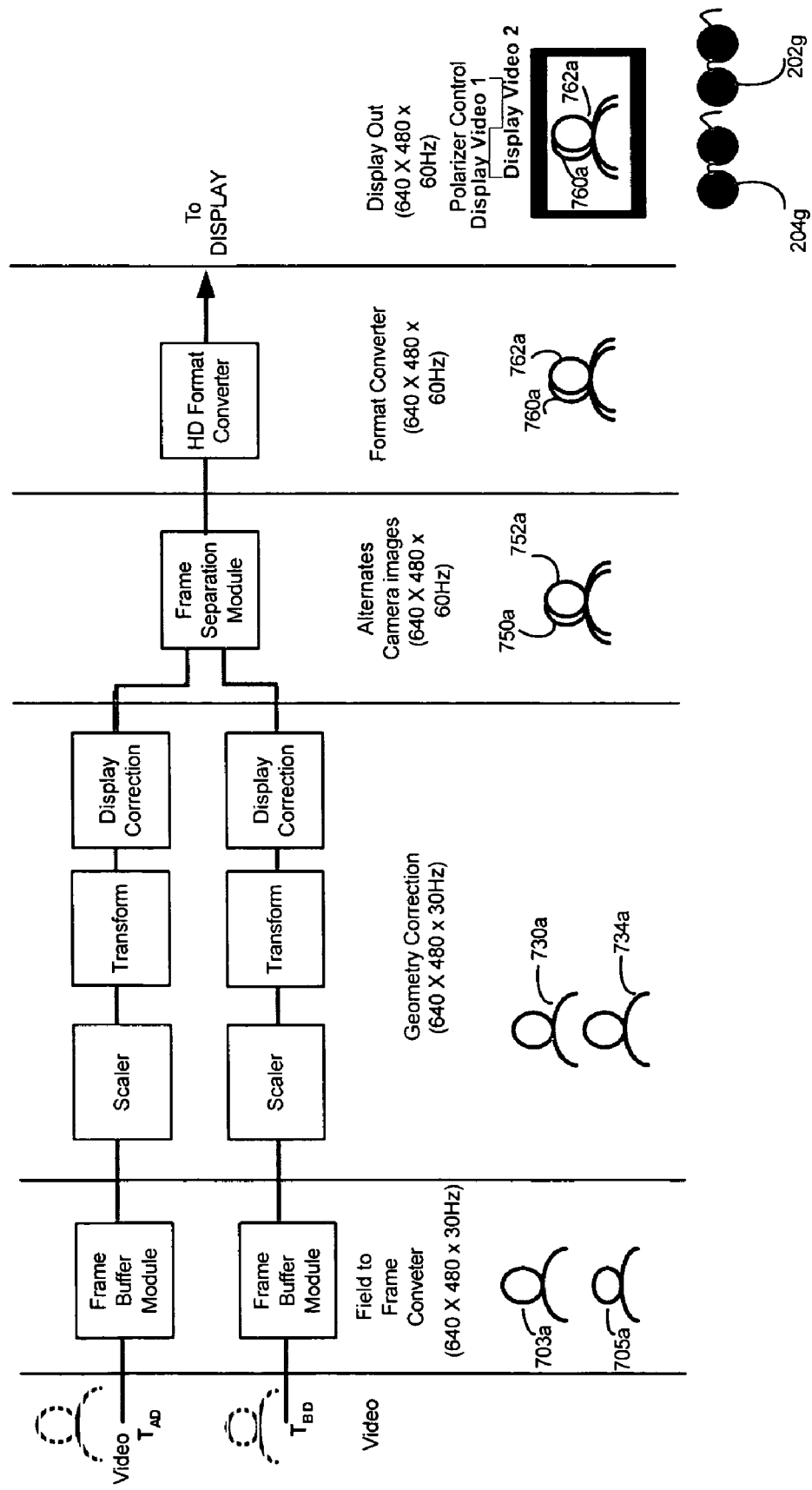
FIG. 10 illustrates a flow diagram for processing a set of image streams for presentation on the same multidirectional display using temporal multiplexing for the site configuration shown in FIG. 2.

FIG. 10 illustrates a method for presenting multidirectional images of the same remote actual position on the same display by alternating images in coordination with a control signal to a respective perception device associated with each local actual position in accordance with an embodiment of the present invention. Here, a DPM 602 uses the frame separation module 750 to separate frames for temporal multiplexing. In one example, each participant uses a pair of active polarized visors, which are activated by a directional control signal in coordination with the time period in which the image stream corresponding to that actual position is displayed. By using active polarizing glasses and activating the glasses at the proper refresh rate, the participant views only the image stream corresponding to her actual position. For example, for the 2×2 configuration of FIG. 2, each pair of image streams (as indicated above) is processed by the frame grabbers 712, the frame buffer modules 703, and the geometry correction modules 706. For temporal multiplexing, for example, the frame separation module 750 alternately refreshes a respective full-frame image captured by each of cameras $T_{AD}$ and $T_{BD}$ to coincide with a first directional control signal the module 750 also produces and which is received by the visors. A participant seated at actual viewing position $S_A$ wearing the first visor, would see the images of participant D, on display $Q_D$, taken from camera TA. A participant seated at actual viewing position $S_B$ and wearing the second visor, would instead see on display $Q_D$ the image stream from camera $T_{BD}$. Thus, each participant has the perspective correct eye contact. The same functionality would be used to control other visors associated with the other actual viewing positions, $S_C$ and $S_D$ at the other site. In this example, the directional control signal operates at a 60 Hz cycle and alternately enables one of the two views captured by the image capture devices associated with each multidirectional display Q.

Each of these modules can be implemented separately or in combination. Additionally, each of these modules can be implemented in software stored in a computer usable medium for execution on a processor, or in other computer usable mediums such as hardware, firmware or as a combination of two or more of these. For example, the TPM 500, and/or the DPM 600 can be implemented with software for execution on a general purpose processor, alone or in combination with functionality embodied in an Application Specific Integrated Circuit (ASIC).

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the hereto appended claims.

We claim:

1. A videoconferencing system providing contact between a first and second site, the system comprising:
at the first site:
a plurality of first actual viewing positions;
a plurality of first multidirectional image capture systems,
each first multidirectional image capture system comprising a plurality of first image capture devices,
the number of first multidirectional image capture systems corresponding to the number of first actual viewing positions,
each first multidirectional image capture system having for each first actual viewing position, a first image capture device oriented to capture an image stream of that first actual viewing position along a line of sight from a virtual viewing position corresponding to a second actual viewing position at the second site to that first actual viewing position; and
at the second site:
a plurality of second actual viewing positions, each of which has a corresponding virtual viewing position at the first site, and
a first plurality of multidirectional displays, each of which is oriented towards a distinct one of the second actual viewing positions, each multidirectional display being communicatively coupled to a subset of the plurality of first image capture devices to receive their respective image streams and to concurrently display the received image streams, the subset comprising the first image capture devices that are oriented towards the same first actual viewing position.

2. The system of claim 1, further comprising:
at the second site:
- a plurality of second multidirectional image capture systems, each of the second multidirectional image capture systems comprising a plurality of second image capture devices, the number of second multidirectional image capture systems corresponding to the number of second actual viewing positions, and
- each second multidirectional image capture system having for each second actual viewing position, a second image capture device oriented to capture an image stream of that second actual viewing position along a line of sight from a virtual viewing position corresponding to a first actual viewing position at the first site to that second actual viewing position; and at the first site:
- a second plurality of multidirectional displays, each of which is oriented towards a distinct one of the first actual viewing positions, each of these multidirectional displays being communicatively coupled to a subset of the plurality of second image capture devices to receive their respective image streams and to concurrently display the received image streams, the subset comprising the second image capture devices that are oriented towards the same second actual viewing position.

3. The system of claim 1 wherein the arrangement of actual viewing positions at the first site is symmetrical to the arrangement of actual viewing positions at the second site.

4. The system of claim 1 wherein the arrangement of actual viewing positions and virtual viewing positions at the first site is a circular arrangement.

5. The system of claim 1 wherein the arrangement of actual viewing positions and virtual viewing positions at the first site is a rectangular arrangement.

6. The system of claim 1 wherein the multidirectional display devices are high resolution fixed pixel displays that output the received image streams at substantially the full width of the display.

7. The system of claim 1 wherein an angle between the lines of sight of adjacent image capture devices is significantly greater than an angle used for capturing images with stereoscopic disparity.

8. The system of claim 1 wherein an angle between the lines of sights of adjacent image capture devices is approximately 60 degrees.

9. The system of claim 1 wherein:
the second site comprises:
- two, second actual viewing positions;
- two, multidirectional displays; and the first site comprises:
- two, first actual viewing positions;
- two, first multidirectional image capture systems, each of which comprises two image capture devices, wherein
  - one image capture device in each multidirectional image capture system is oriented along a line of sight from a virtual viewing position corresponding to one of the two second actual viewing positions to one of the two first actual viewing positions, and
  - the other image capture device in each multidirectional image capture system is oriented along a line of sight from a virtual viewing position corresponding to the other second actual viewing position to the other first actual viewing position.

10. The system of claim 1 wherein:
the second site comprises:
- three, second actual viewing positions;
- three, multidirectional displays; and the first site comprises:
- three, first actual viewing positions;
- three, first multidirectional image capture systems, each of which comprises three image capture devices, wherein
  - one image capture device in each multidirectional image capture system is oriented along a line of sight from a virtual viewing position corresponding to one of the three second actual viewing positions to one of the three first actual viewing positions, and
  - the other image capture device in each multidirectional image capture system is oriented along a line of sight from a virtual viewing position corresponding to the other second actual viewing position to the other first actual viewing position.

11. The system of claim 1, further comprising:
at the second site, a processing module coupled to each multidirectional display, each processing module coupled to receive multiplexed image streams comprising one image stream from one first image capture device in each first multi-directional image capture system, the image capture devices being those that are oriented towards the same first actual viewing position,
demultiplex the multiplexed image streams, and
combine the demultiplexed image streams into a single image stream to provide to the respective multi-directional display device for display thereon.

12. The system of claim 11, wherein the processing module further comprises a module which decreases differences in the demultiplexed image streams resulting from the first image capture devices being at varying distances to the first actual viewing positions.

13. The system of claim 11, wherein the processing module further comprises a module which selectively processes individual full images from a demultiplexed image streams, alternately providing the full images to the multi-directional display device in a single image stream.

14. The system of claim 11, wherein the processing module further comprises a module which interleaves selected columns of the demultiplexed image streams to form the single image stream for display on a corresponding multi-directional display device, the single image providing for the concurrent display of the image streams.

15. The system of claim 14, wherein the selected columns of an image stream comprise a subset of all of the columns of the image stream, such that the single image stream has a same resolution as the one of the image streams.

16. The system of claim 14, wherein the selected columns of an image stream comprise all of the columns of the image stream, such that the single image stream has a higher resolution than the image streams.

17. The system of claim 11, wherein the processing module further comprises a converter which converts the resolution of the single image stream into a high definition resolution.

18. The system of claim 11, further comprising:
at the first site, a plurality of transmission processing modules, each transmission processing module coupled to one first image capture device in each first multi-directional image capture system to receive an image stream therefrom, the image capture devices being those that are oriented towards the same first actual viewing position, and multiplex the received image streams, and further coupled to a corresponding one of the display processing modules at the second site to provide the multiplexed image streams thereto.

19. The system of claim 1, wherein each multidirectional display system comprises:
   a display panel having a plurality of columns of pixels;
   a lens array, having a plurality of lenticular lenses, each lens comprising plural facets, each facet substantially aligned with a single column of pixels to direct light from the column along an line of sight, and wherein the angle between the line of sight and a normal axis of the panel substantially exceeds an angle of stereoscopic disparity.

20. A videoconferencing system providing contact between a first site having actual viewing positions $S_j$ and a second site having actual viewing positions $S_i$, where i and j are equal and are the number of viewing positions at each site, the system comprising:
   at the first site:
      multidirectional image capture systems $M_j$, the number of multidirectional image capture system $M_j$ corresponding to the number of actual viewing positions $S_j$;
      wherein each multidirectional image capture system $M_j$ comprises plural image capture devices $T_{ij}$, each of which is disposed at or near a virtual viewing position $V_i$ that corresponds to an actual viewing position $S_i$ at the second site, and directed along a line of site $L_{ij}$ towards an actual viewing position $S_j$ at the first site, so that each image capture device $T_{ij}$ captures an image stream of actual viewing position $S_j$ with the correct perspective and eye-to-eye contact that a participant seated at actual viewing position $S_i$ would have of actual viewing position $S_j$ if seated at virtual viewing position $V_i$; and
   at the second site:
      multidirectional displays $Q_j$, each of which is oriented directly towards a distinct one of the actual viewing positions $S_j$, each multidirectional display $Q_j$ being communicatively coupled to a distinct subset of the plurality of image capture devices $T_{ij}$ at the first site to receive the image streams of actual viewing position $S_j$ from different virtual positions $V_i$ and concurrently display the received image streams to participants each of the actual viewing positions $S_j$.

21. The system of claim 20, further comprising:
   at the second site:
      multidirectional image capture systems $M_i$, the number of multidirectional image capture systems $M_i$ corresponding to the number of actual viewing positions $S_i$;
      each second multidirectional image capture system having for each second actual viewing position, a second image capture device oriented to capture an image stream of that second actual viewing position along a line of sight from a virtual viewing position corresponding to a first actual viewing position at the first site to that second actual viewing position; and
      wherein each multidirectional image capture system $M_i$ comprises plural image capture devices $T_{ji}$, each of which is disposed at or near a virtual viewing position $V_j$ that corresponds to an actual viewing position $S_j$ at the first site, and directed along a line of site L towards an actual viewing position $S_i$ at the second site, so that each image capture device $T_{ji}$ captures an image stream of actual viewing position $S_i$ with the correct perspective and eye-to-eye contact that a participant seated at actual viewing position $S_j$ would have of actual viewing position $S_i$ if seated at virtual viewing position $V_j$; and
   at the first site:
      multidirectional displays $Q_i$, each of which is oriented directly towards a distinct one of the actual viewing positions $S_j$, each multidirectional display $Q_i$ being communicatively coupled to a distinct subset of the plurality of image capture devices $T_{ji}$ at the first site to receive the image streams of actual viewing position $S_j$ from different virtual positions $V_j$ and concurrently display the received image streams to participants each of the actual viewing positions $S_j$.

22. The system of claim 21, wherein i=j=2.

23. The system of claim 21, wherein i=j=3.

24. A videoconferencing method providing contact between a first and second site, the method comprising:
   at the first site:
      capturing a plurality of image streams of a plurality of first actual viewing positions from respective ones of a plurality of first multidirectional image capture systems, each first multidirectional image capture system comprising a plurality of first image capture devices, the number of first multidirectional image capture systems corresponding to the number of first actual viewing positions, each first multidirectional image capture system having for each first actual viewing position, a first image capture device oriented to capture an image stream of that first actual viewing position along a line of sight from a virtual viewing position corresponding to a second actual viewing position at the second site to that first actual viewing position;
      transmitting the captured image streams to the second site; and
   at the second site:
      concurrently displaying the captured image streams on a first plurality of multidirectional displays, each of which is oriented towards a distinct one of a plurality of second actual viewing positions, each of which has a corresponding virtual viewing position that the first site, each multidirectional display being communicatively coupled to a subset of the plurality of first image capture devices to receive their respective image streams, the subset comprising the first image capture devices that are oriented towards the same first actual viewing position.

25. The method of claim 24, further comprising:
   at the second site:
      capturing a plurality of image streams of the second actual viewing positions from respective ones of a plurality of second multidirectional image capture systems, each the second multidirectional image capture systems comprising a plurality of second image capture devices, the number of second multidirectional image capture systems corresponding to the number of second actual viewing positions, and each second multidirectional image capture system having for each second actual viewing position, a second image capture device oriented to capture an image stream of that second actual viewing position along a line of sight from a virtual viewing position corresponding to a first actual viewing position at the first site to that second actual viewing position;

transmitting the captured images to the first site; and at the first site:

concurrently displaying the image streams captured at the first site on a second plurality of multidirectional displays, each of which is oriented towards a distinct one of the first actual viewing positions, each of which has a corresponding virtual viewing position that the second site, each of the second plurality of multidirectional displays being communicatively coupled to a subset of the plurality of second image capture devices to receive their respective image streams, the subset comprising the second image capture devices that are oriented towards the same second actual viewing position.

26. The method of claim 24 wherein the arrangement of actual viewing positions at the first site is symmetrical to the arrangement of actual viewing positions at the second site.

27. The method of claim 24 wherein the arrangement of actual viewing positions and virtual viewing positions at the first site is circular.

28. The method of claim 24 wherein the arrangement of actual viewing positions and virtual viewing positions at the first site is rectangular.

29. The method of claim 24 wherein the multidirectional display devices are high resolution fixed pixel displays that output the received image streams at substantially the full width of the display.

30. The method of claim 24 wherein an angle between the lines of sights of adjacent image capture devices is significantly greater than an angle used for capturing images with stereoscopic disparity.

31. The method of claim 24 wherein an angle between the lines of sights of adjacent image capture devices is approximately 60 degrees.

32. The method of claim 24 wherein:

the second site comprises:
  two, second actual viewing positions;
  two, multidirectional displays; and the first site comprises:
  two, first actual viewing positions;
  two, first multidirectional image capture systems, each of which comprises two image capture devices, wherein
    one image capture device in each multidirectional image capture system is oriented along a line of sight from a virtual viewing position corresponding to one of the two second actual viewing positions to one of the two first actual viewing positions, and
    the other image capture device in each multidirectional image capture system is oriented along a line of sight from a virtual viewing position corresponding to the other second actual viewing position to the other first actual viewing position.

33. The method of claim 24 wherein:

the second site comprises:
  three, second actual viewing positions;
  three, multidirectional displays; and the first site comprises:
  three, first actual viewing positions;
  three, first multidirectional image capture systems, each of which comprises three image capture devices, wherein
    one image capture device in each multidirectional image capture system is oriented along a line of sight from a virtual viewing position corresponding to one of the three second actual viewing positions to one of the three first actual viewing positions, and
    the other image capture device in each multidirectional image capture system is oriented along a line of sight from a virtual viewing position corresponding to the other second actual viewing position to the other first actual viewing position.

* * * * *